(12) United States Patent
Liu et al.

(10) Patent No.: US 12,513,429 B2
(45) Date of Patent: Dec. 30, 2025

(54) OPTICAL SENSOR OUTPUTTING PARTIAL IMAGE DATA OF PIXEL ARRAY

(71) Applicant: PixArt Imaging Inc., Hsin-Chu County (TW)

(72) Inventors: Ren-Chieh Liu, Hsin-Chu County (TW); Yi-Cheng Chiu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/747,509

(22) Filed: Jun. 19, 2024

(65) Prior Publication Data

US 2024/0340550 A1 Oct. 10, 2024

Related U.S. Application Data

(63) Continuation of application No. 18/202,964, filed on May 29, 2023, now Pat. No. 12,052,523, which is a continuation of application No. 17/401,554, filed on Aug. 13, 2021, now Pat. No. 11,706,542, which is a continuation-in-part of application No. 17/009,417, filed on Sep. 1, 2020, now Pat. No. 11,290,671.

(51) Int. Cl.
*H04N 25/77* (2023.01)
*H04N 25/589* (2023.01)
*H04N 25/767* (2023.01)
*H04N 25/771* (2023.01)
*H04N 25/78* (2023.01)

(52) U.S. Cl.
CPC ........... *H04N 25/77* (2023.01); *H04N 25/589* (2023.01); *H04N 25/767* (2023.01); *H04N 25/771* (2023.01); *H04N 25/78* (2023.01)

(58) Field of Classification Search
CPC .... H04N 25/589; H04N 25/767; H04N 25/77; H04N 25/771; H04N 25/78; H04N 25/00; H04N 25/707; H04N 25/708; H04N 25/44
See application file for complete search history.

(56) References Cited

U.S. PATENT DOCUMENTS

| | | | |
|---|---|---|---|
| 6,366,317 B1 | 4/2002 | Mattison et al. | |
| 11,546,540 B2 | 1/2023 | Liu et al. | |
| 11,812,176 B2 | 11/2023 | Liu et al. | |
| 2011/0054583 A1 | 3/2011 | Litt et al. | |
| 2011/0304757 A1 | 12/2011 | Egawa | |
| 2016/0344969 A1* | 11/2016 | Furukawa | H04N 25/616 |
| 2017/0353675 A1 | 12/2017 | Onuki et al. | |
| 2018/0167575 A1* | 6/2018 | Watanabe | H04N 25/78 |
| 2019/0026901 A1 | 1/2019 | Fu et al. | |
| 2022/0109799 A1* | 4/2022 | Niwa | H04N 25/443 |
| 2025/0014337 A1 | 1/2025 | Schroeder | |

* cited by examiner

*Primary Examiner* — Albert H Cutler
(74) *Attorney, Agent, or Firm* — WPAT, PC

(57) ABSTRACT

There is provided a pixel circuit capable of outputting time difference data and image data, and including an image circuit and a difference circuit. The image circuit is used to record and output detected light energy of a first interval as the image data. The difference circuit is used to record and output a variation of detected light energy between the first interval and a second interval as the time difference data. The pixel circuit selects to output at least one of the time difference data and the image data.

20 Claims, 20 Drawing Sheets

| | exposure | reset 1st node | charge transfer | read image data |
|---|---|---|---|---|
| transistor T1 | Off | On | Off | Off |
| transistor T2 | Off | Off | On | Off |
| transistor T4 | Off | On | On | On |
| transistor T5 | Off | Off | Off | Off |
| transistor T6 | Off | Off | Off | Off |
| transistor T8 | Off | Off | Off | Off |
| node V1 | - | Vr | Vs | Vs |
| node V2 | - | - | - | - |

FIG. 14

| | exposure & 1st charge transfer | reset 2nd node | exposure & 2nd charge transfer | read difference data |
|---|---|---|---|---|
| transistor T1 | Off | Off | Off | Off |
| transistor T2 | On | Off | On | Off |
| transistor T4 | On | On | On | On |
| transistor T5 | Off | On | Off | Off |
| transistor T6 | Off | On | Off | Off |
| transistor T8 | Off | On | Off | On |
| node V1 | Vold | Vold | Vold + $\Delta$V | Vold + $\Delta$V |
| node V2 | - | Vaz | Vaz + $\Delta$V | Vaz + $\Delta$V |

FIG. 15

| | exposure&2nd charge transfer | read difference data | reset 2nd node |
|---|---|---|---|
| T1 | Off | Off | Off |
| T2 | On | Off | Off |
| T4 | On | On | On |
| T5 | Off | Off | On |
| T6 | Off | Off | On |
| T8 | Off | On | On |
| V1 | Vold + ΔV | Vold + ΔV | new Vold |
| V2 | Vaz + ΔV | Vaz + ΔV | Vaz |

FIG. 16A

|    | exposure | reset 1st node | charge transfer&check variation | read image data | reset 2nd node |
|----|----------|----------------|--------------------------------|-----------------|----------------|
| T1 | Off      | On             | Off                            | Off             | Off            |
| T2 | Off      | Off            | Off                            | Off             | Off            |
| T4 | Off      | On             | On                             | On              | On             |
| T5 | Off      | Off            | Off                            | Off             | On             |
| T6 | Off      | Off            | Off                            | Off             | On             |
| T8 | Off      | Off            | On                             | Off             | On             |
| V1 | -        | Vr             | Vold + ΔV                      | Vs              | new Vold       |
| V2 | -        | -              | Vaz + ΔV                       | -               | Vaz            |

FIG. 17A

|    | exposure | charge transfer&check variation | read image data | reset 2nd node | reset 1st node |
|----|----------|--------------------------------|-----------------|----------------|----------------|
| T1 | Off | Off | Off | Off | On |
| T2 | Off | Off | Off | Off | Off |
| T4 | Off | On | On | On | On |
| T5 | Off | Off | Off | On | Off |
| T6 | Off | Off | Off | On | Off |
| T8 | Off | On | Off | On | Off |
| V1 | - | Vold + ΔV | Vs | new Vold | Vr |
| V2 | - | Vaz + ΔV | - | Vaz | - |

FIG. 18A

OPTICAL SENSOR OUTPUTTING PARTIAL IMAGE DATA OF PIXEL ARRAY

CROSS REFERENCE TO RELATED APPLICATION

The present application is a continuation application of U.S. patent application Ser. No. 18/202,964 filed on, May 29, 2023, which is a continuation application of U.S. patent application Ser. No. 17/401,554 filed on, Aug. 13, 2021, which is a continuation-in-part application of U.S. patent application Ser. No. 17/009,417 filed on, Sep. 1, 2020, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a pixel structure and, more particularly, to a pixel circuit capable of selecting to output time difference data and image data, and an operating method of a pixel array including the same.

2. Description of the Related Art

Nowadays, the optical sensor outputs voltage values to be converted to a digital image frame by an analog-to-digital converter, and then a processor of the optical sensor performs the following operation using the digital image frame, e.g., calculating displacement or performing motion detection.

However, in an optical sensor performing the operation in a digital backend thereof, the digital backend generally needs frame buffers to store the whole digital image frame. Generally, the optical sensor needs two frame buffers to store pixel data.

Accordingly, it is necessary to provide a pixel structure that performs various operations on pixel data at analog phase.

SUMMARY

The present disclosure provides a pixel circuit that represents detected light intensity using a pulse width, and performs the pixel-wise operation, including intra-pixel and inter-pixel operations, using pulse width signals.

The present disclosure provides an optical sensor including multiple pixel circuits, multiple sharing circuits and a readout circuit. Each pixel circuit includes a photodiode, a storage capacitor, an image circuit, and a difference circuit. The photodiode is configured to generate light energy. The storage capacitor has a first end and a second end. The image circuit includes a transfer transistor, a first reset transistor and a first output transistor. The transfer transistor is connected between the photodiode and the first end of the storage capacitor. The first reset transistor has a source connected between the transfer transistor and the first end of the storage capacitor. The first output transistor is connected between the first end of the storage capacitor and a first readout line. The difference circuit includes a second output transistor and a second reset transistor. The second output transistor is connected between the second end of the storage capacitor and a second readout line. The second reset transistor has a source connected between the second end of the storage capacitor and the second output transistor, and configured to reset the second end of the storage capacitor to a reset voltage. Each sharing circuit is shared by the each pixel circuit with other pixel circuits at the same column of the pixel array as the each pixel circuit, and includes a first comparator and a second comparator. The first comparator is connected to the first readout line, and configured to output image data. The second comparator is connected to the second readout line, and configured to output time difference data or a state-change signal. The readout circuit is configured to read image data of all the multiple pixel circuits acquired in a first interval via first readout lines to form a reference image, and read image data, acquired in a second interval via second readout lines, of only a part of pixel circuits among the multiple pixel circuits having a change identified according to the time difference data or the state-change signal.

The present disclosure further provides an optical sensor including multiple pixel circuits and a readout circuit. Each pixel circuit includes a photodiode, a storage capacitor, an image circuit and a difference circuit. The photodiode is configured to generate light energy. The storage capacitor has a first end and a second end. The image circuit is connected to the first end of the storage capacitor, and configured to output image data associated with the light energy generated in a first interval by the photodiode. The difference circuit is connected to the second end of the storage capacitor, and configured to output time difference data associated with a variation of the light energy generated between the first interval and a second interval by the photodiode. The readout circuit is configured to read image data of all the multiple pixel circuits acquired in the first interval to form a reference image, and read image data, acquired in the second interval, of only a part of pixel circuits among the multiple pixel circuits having a change of the variation of the light energy according to the time difference data.

The present disclosure further provides an optical sensor including multiple pixel circuits arranged in a pixel array and a readout circuit. Each pixel circuit is configured to output image data in a first interval and output time difference data in a second interval. The readout circuit is configured to read the image data of all the multiple pixel circuits acquired in the first interval to form a reference image, and read the image data, acquired in the second interval, of only a part of pixel circuits among the multiple pixel circuits having a change identified according to the time difference data.

The temporal circuit of the present disclosure is used to store detected light energy of different time intervals and to output detection signals of different pulse widths, wherein the pulse width is positively related to the detected light energy.

BRIEF DESCRIPTION OF THE DRAWINGS

Other objects, advantages, and novel features of the present disclosure will become more apparent from the following detailed description when taken in conjunction with the accompanying drawings.

FIG. 14 is a schematic diagram of the status of every element when the pixel circuit of the present disclosure outputs image data.

FIG. 15 is a schematic diagram of the status of every element when the pixel circuit of the present disclosure outputs time difference data.

FIGS. 16A and 16B are operational schematic diagrams of the pixel circuit of the present disclosure outputting time difference data.

FIGS. 17A and 17B are operational schematic diagrams of the pixel circuit of the present disclosure performing the event detection.

FIGS. 18A and 18B are other operational schematic diagrams of the pixel circuit of the present disclosure performing the event detection.

DETAILED DESCRIPTION OF THE EMBODIMENT

It should be noted that, wherever possible, the same reference numbers will be used throughout the drawings to refer to the same or like parts.

The present disclosure is related to a pixel circuit that performs pixel-wise analog operation. Every pixel outputs a detection signal having a pulse width corresponding to detected light energy. An operation circuit is used to perform the analog operation on the pulse width (PW) signals. The voltage value after the analog operation is further converted to a PW signal using a voltage-temporal conversion circuit at first and then a next analog operation is performed by the same or by another operation circuit. In this way, all data operation is accomplished in the analog phase without being converted to digital data at first.

Figure 1:
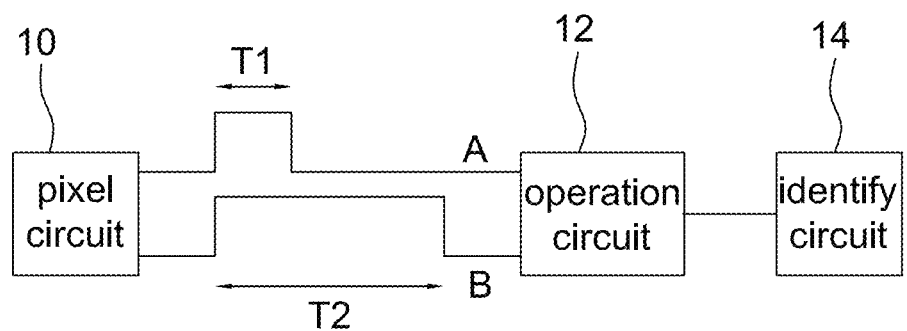
FIG. 1 is a schematic block diagram of a pixel structure of an optical sensor according to one embodiment of the present disclosure.

Referring to FIG. 1, it is a schematic block diagram of a pixel structure of an optical sensor (e.g., CMOS image sensor) according to one embodiment of the present disclosure. The pixel structure includes a pixel circuit 10 and an operation circuit 12. The pixel circuit 10 is used to output detection signals of different time intervals, e.g., signals A and B in FIG. 1 indicating different detection signals detected within different time intervals. In the present disclosure, the detection signals A and B respectively indicate magnitude of light energy detected by the pixel circuit 10 using pulse widths T1 and T2, wherein when the detected light energy is larger, the pulse width of the corresponding detection signals A or B is longer.

Figure 5:
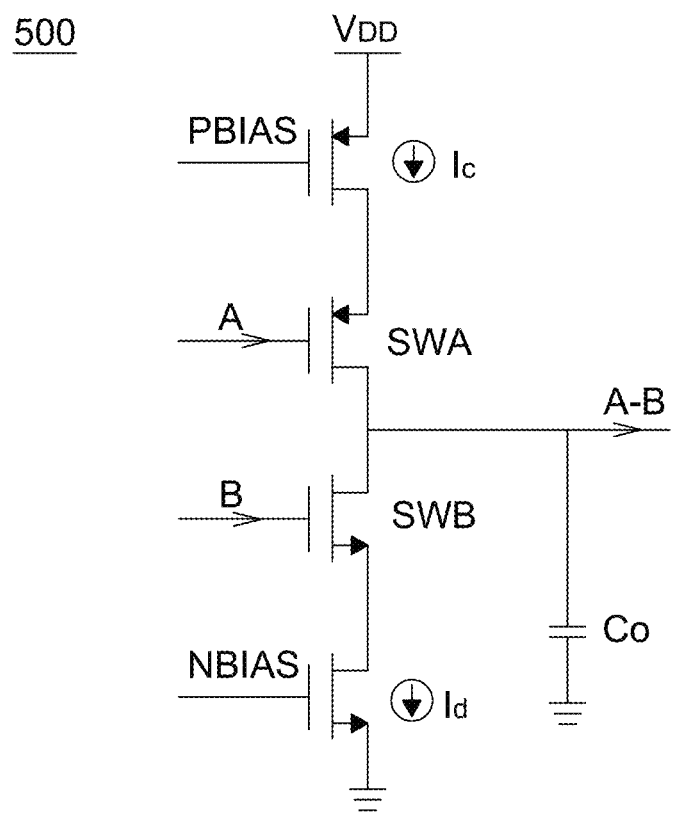
FIG. 5 is a circuit diagram of a subtraction circuit of a pixel circuit according to one embodiment of the present disclosure.
Figure 6:
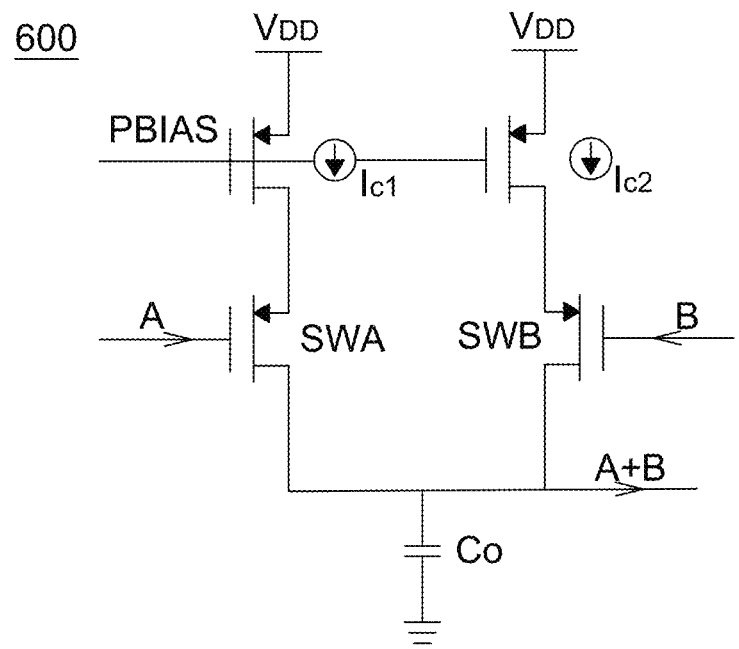
FIG. 6 is a circuit diagram of an addition circuit of a pixel circuit according to one embodiment of the present disclosure.
Figure 7:
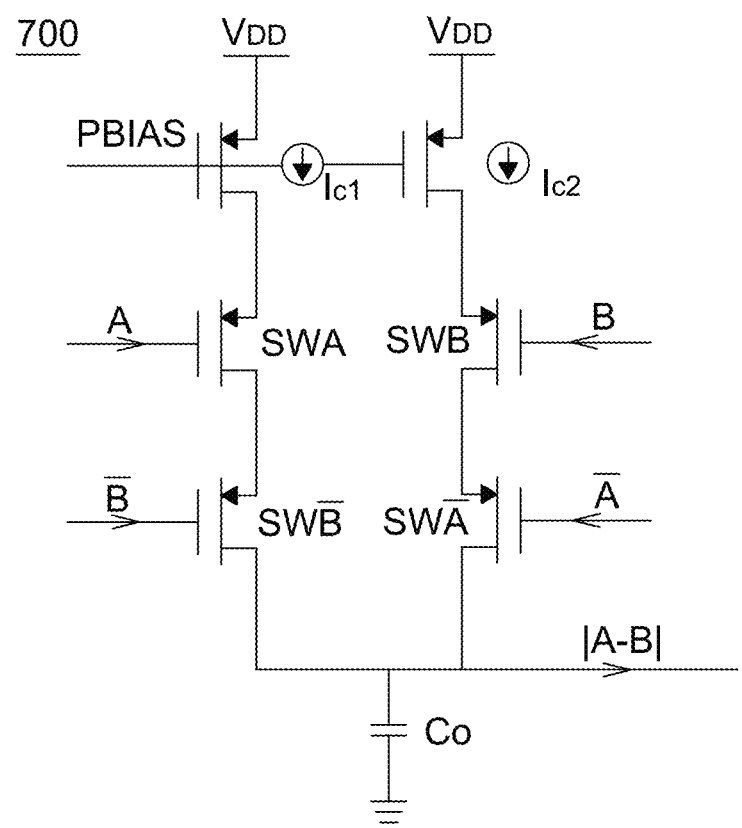
FIG. 7 is a circuit diagram of an absolute difference circuit of a pixel circuit according to one embodiment of the present disclosure.

The operation circuit 12 includes any circuit used to perform the operation between signals, e.g., described by a subtraction circuit in FIG. 5, an addition circuit in FIG. 6 and an absolute difference circuit in FIG. 7 herein, but not limited thereto. In a pixel array including multiple pixels, the operation circuit 12 is arranged inside each pixel to process data in the pixel or arranged between pixels to process data between pixels.

In some aspects, the pixel structure further includes an identify circuit 14. The identify circuit 14 includes, for example, a comparator for comparing the output result of the operation circuit 21 with a predetermined threshold so as to identify an operating state of a device adopting the pixel structure of the present disclosure. For example, when the pixel structure of the present disclosure is adapted to a mouse device, the identify circuit 14 is used to identify whether the mouse device is lifted up by a user. The output result of the operation circuit 12 indicates a brightness variation. When the identify circuit 14 identifies that the brightness variation is larger than or smaller than a brightness threshold, the mouse device is identified to be lifted by the user. The identify circuit 14 then outputs a control signal to perform corresponding controls, e.g., turning off the light source and/or not outputting displacement signals, but not limited to.

Figure 2:
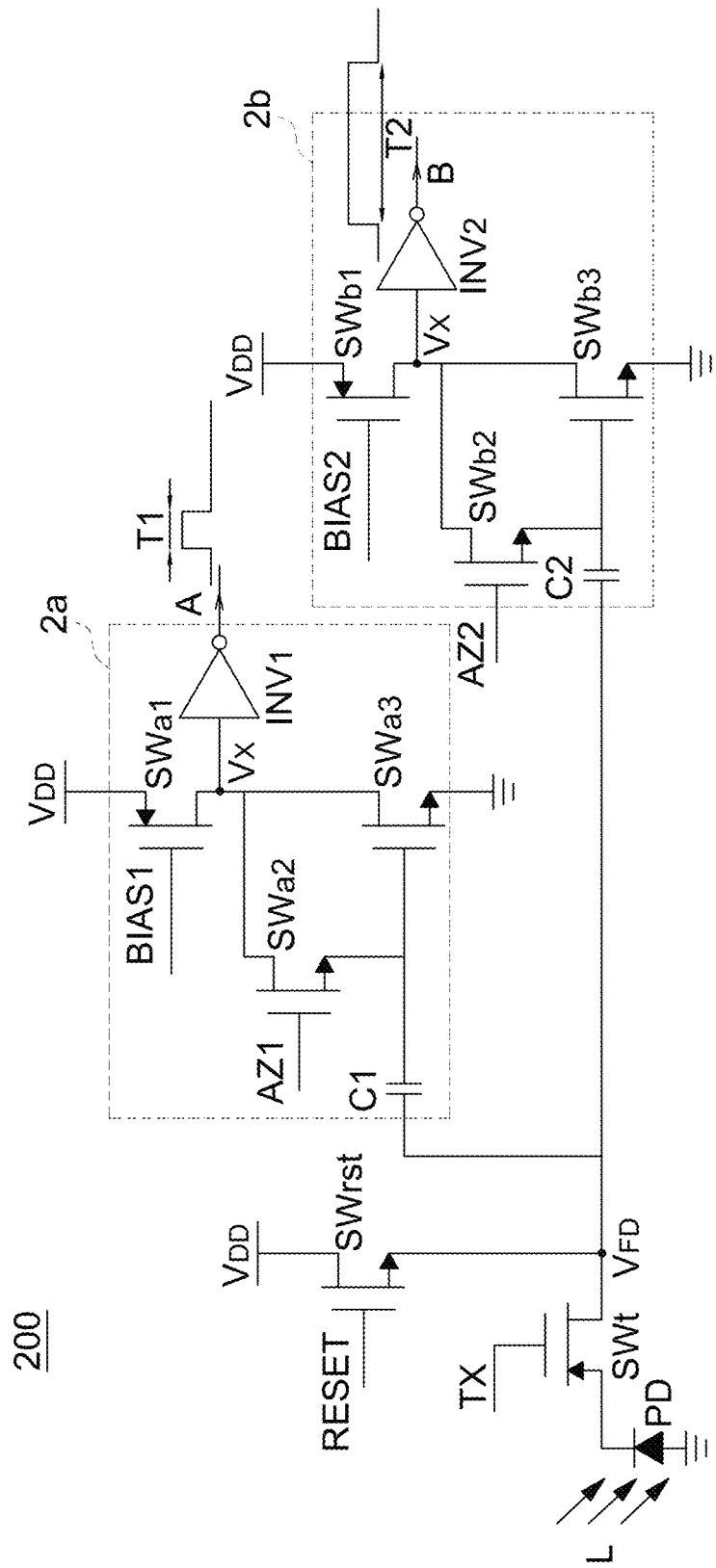
FIG. 2 is a circuit diagram of a pixel circuit according to one embodiment of the present disclosure.

Please referring to FIG. 2, it is a circuit diagram of a pixel circuit 200 according to one embodiment of the present disclosure. The pixel circuit 200 is used to output pulse width (PW) signals A and B, i.e. detection signals. The pixel circuit 200 includes a photodiode PD, a transfer transistor SWt, a reset transistor SWrst, a first temporal circuit $2a$ and a second temporal circuit $2b$ all connected to a node $V_{FD}$.

The photodiode PD is used to generate light energy according to the light L being received. The light energy is respectively stored in the first temporal circuit $2a$ and the second temporal circuit $2b$ within different time intervals (e.g., controlled by a control signal TX). In the present disclosure, in addition to storing light energy detected within different time intervals, the first temporal circuit $2a$ and the second temporal circuit $2b$ further respectively convert the stored light energy into detection signals A and B having corresponding pulse widths (e.g., T1 and T2) for the operation circuit 12 to perform analog operation. The first temporal circuit $2a$ and the second temporal circuit $2b$ have identical circuit arrangement only being operated within different time intervals.

Figure 4A:
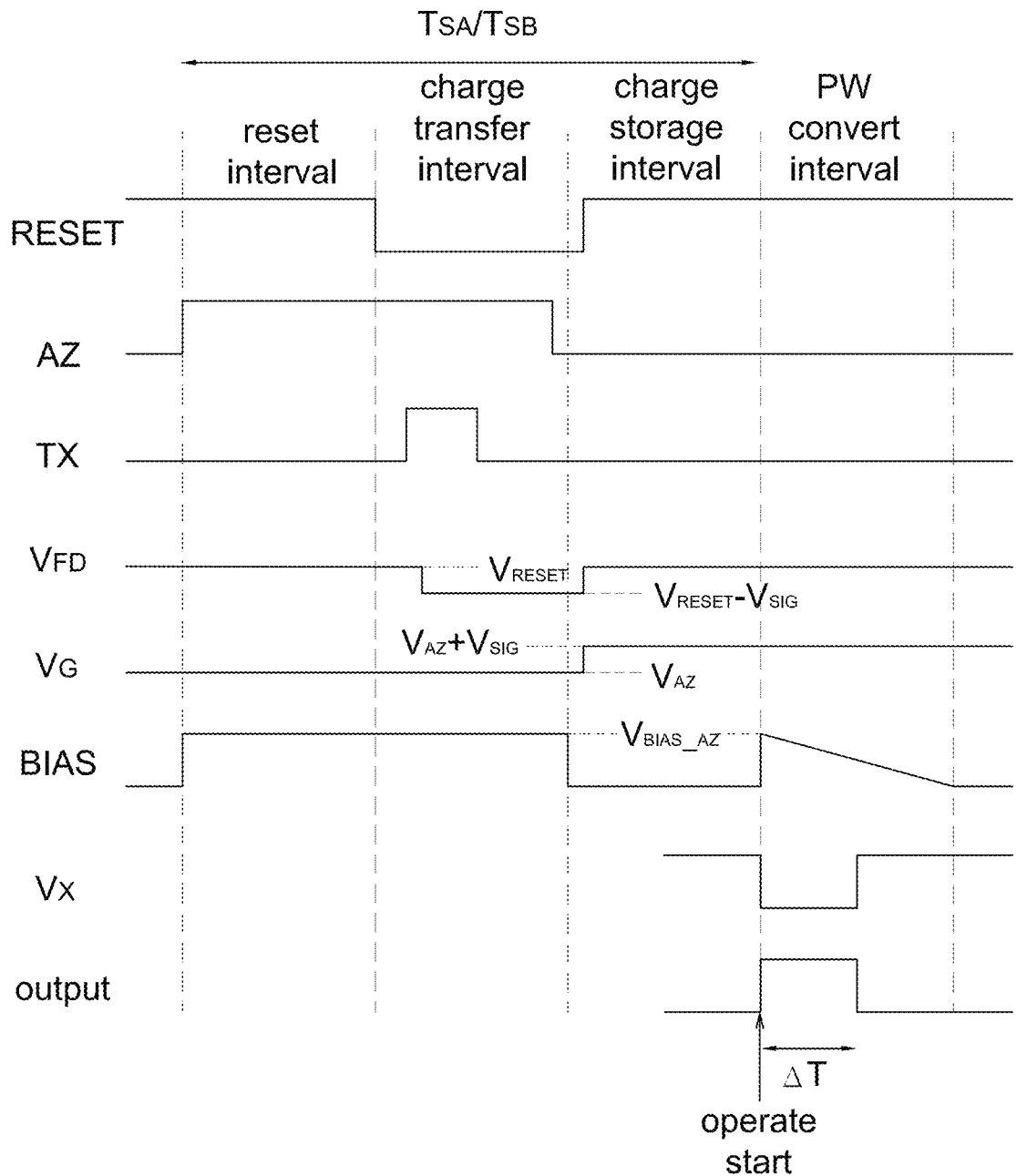
FIG. 4A is an operational timing diagram of the temporal circuit in FIG. 3.
Figure 4B:
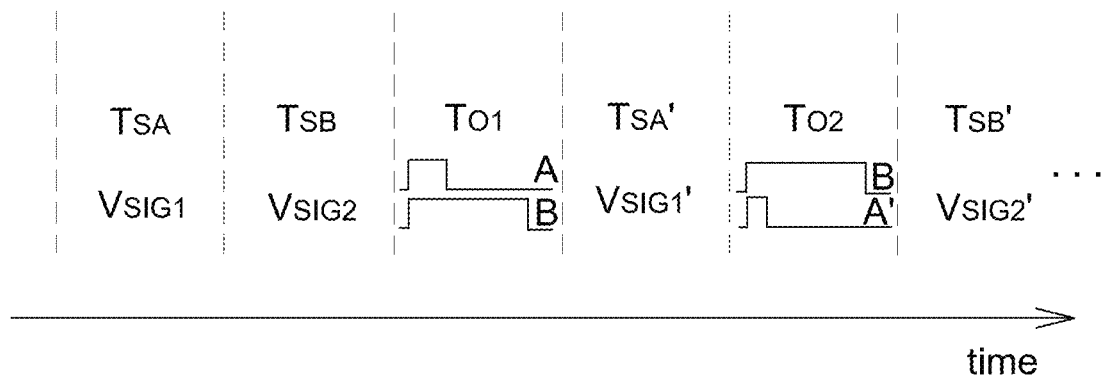
FIG. 4B is an operational timing diagram of the pixel circuit in FIG. 2.

The first temporal circuit $2a$ stores first light energy (e.g., referring to $V_{SIG1}$ shown in FIG. 4B), generated by the photodiode PD within a first interval (e.g., referring to $T_{SA}$ shown in FIG. 4B), and outputs a first detection signal A having a first pulse width T1 according to the first light energy $V_{SIG1}$ within an operation interval (e.g., referring to $T_{O1}$ shown in FIG. 4B).

The second temporal circuit 2b stores second light energy (e.g., referring to $V_{SIG2}$ shown in FIG. 4B) generated by the photodiode PD within a second interval (e.g., referring to $T_{SB}$ shown in FIG. 4B), and outputs a second detection signal B having a second pulse width T2 according to the second light energy $V_{SIG2}$ within the operation interval $T_{O1}$. It is appreciated that lengths of T1 and T2 in drawings are only intended to illustrate but not to limit the present disclosure.

The reset transistor SWrst is coupled between a voltage source $V_{DD}$ and the node $V_{FD}$, and used to reset the first temporal circuit 2a in the first interval $T_{SA}$ and reset the second temporal circuit 2b in the second interval $T_{SB}$.

The transfer transistor SWt is coupled between the photodiode PD and the node $V_{FD}$, and used to transfer the first light energy $V_{SIG1}$ to be stored into the first temporal circuit 2a in the first interval $T_{SA}$ and transfer the second light energy $V_{SIG2}$ to be stored into the second temporal circuit 2b in the second interval $T_{SB}$. In this way, the pixel circuit 200 stores detected light energy of different time intervals to indicate the variation of detected light with time.

In some aspects, the first temporal circuit 2a further includes a first inverter INV1 coupled between an output terminal of the first temporal circuit 2a and the operation circuit 12, and the first inverter INV1 is used to invert a phase of the first detection signal A; the second temporal circuit 2b further includes a second inverter INV2 coupled between an output terminal of the second temporal circuit 2b and the operation circuit 12, and the second inverter INV2 is used to invert a phase of the second detection signal B. In other aspects, the first inverter INV1 and the second inverter INV2 are arranged in the operation circuit 12 instead of being arranged in the first temporal circuit 2a and the second temporal circuit 2b.

Figure 3:
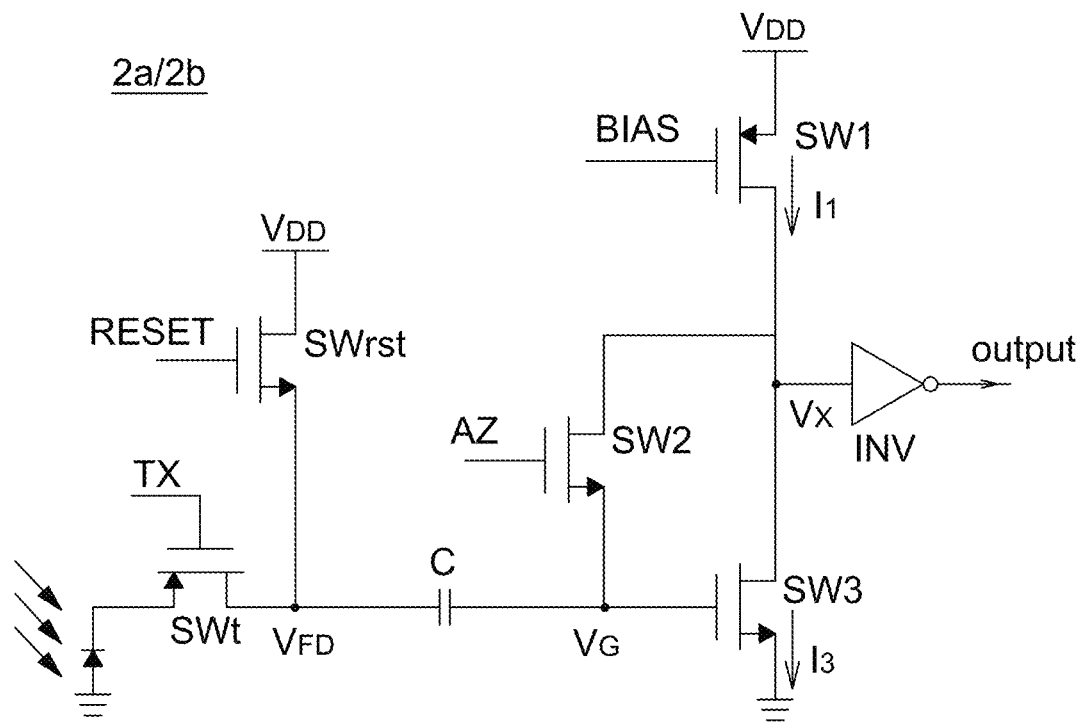
FIG. 3 is a circuit diagram of a temporal circuit of a pixel circuit according to one embodiment of the present disclosure.

Please referring to FIGS. 3 and 4A, FIG. 3 is a circuit diagram of the temporal circuit (e.g., 2a and 2b) of a pixel circuit according to one embodiment of the present disclosure; and FIG. 4A is an operational timing diagram of the temporal circuit 2a/2b in FIG. 3. It should be mentioned that although FIG. 2 shows that a single pixel circuit includes two temporal circuits, but the present disclosure is not limited thereto. In other aspects, each pixel circuit includes a single temporal circuit as shown in FIG. 3 to output a PW signal A or B.

In the present disclosure, operation of the temporal circuits 2a and 2b in FIG. 2 is described using FIGS. 3 and 4A.

The temporal circuits 2a and 2b respectively include a storage capacitor C, a first transistor SW1, a second transistor SW2 and a third transistor SW3. The storage capacitors and the first to third transistors are indicated by different reference numerals in FIG. 2 to indicate belonging to different temporal circuits.

A first end of the storage capacitor C (shown as a first capacitor C1 in the first temporal circuit 2a and as a second capacitor C2 in the second temporal circuit 2b) is coupled to the reset transistor SWrst. The storage capacitor C is used to store light energy generated by the photodiode PD, e.g., the first light energy $V_{SIG1}$ or the second light energy $V_{SIG2}$.

The first transistor SW1 (shown as SWa1 in the first temporal circuit 2a and as SWb1 in the second temporal circuit 2b) is coupled between the voltage source $V_{DD}$ and a node Vx, and is controlled by a control signal BIAS (shown as BIAS1 in the first temporal circuit 2a and as BIAS2 in the second temporal circuit 2b) to convert the stored light energy to a detection signal, e.g., the first detection signal A or the second detection signal B.

The second transistor SW2 (shown as SWa2 in the first temporal circuit 2a and as SWb2 in the second temporal circuit 2b) is coupled between the storage capacitor C and the first transistor SW1, and controlled by a control signal AZ (shown as AZ1 in the first temporal circuit 2a and as AZ2 in the second temporal circuit 2b). In the first interval $T_{SA}$, the second transistor SWb2 is not conducted to avoid changing the stored energy in the second capacitor C2; and in the second interval $T_{SB}$, the first transistor SWa2 is not conducted to avoid changing the stored energy in the first capacitor C1.

The third transistor SW3 (shown as SWa3 in the first temporal circuit 2a and as SWb3 in the second temporal circuit 2b) is coupled between a second end of the storage capacitor C and a ground voltage.

Please referring to FIG. 4A again, it shows that operation of the temporal circuit 2a/2b includes a reset interval, a charge transfer interval, a charge storage interval and a pulse width (PW) convert interval. In the reset interval, control signals BIAS, RESET and AZ are respectively at a high voltage level to reset charges on the storage capacitor C, e.g., a voltage of the node $V_{FD}$ being reset to $V_{RESET}$ (e.g., equal to $V_{DD}$) and a voltage of the node VG being reset to $V_{AZ}$. In the charge transfer interval, the control signal RESET is changed to a low voltage level, and when the control signal TX is changed to a high voltage level, the light energy $V_{SIG}$ detected by the photodiode PD is transferred to the node $V_{FD}$ via the transfer transistor SWt to cause the voltage thereon to decrease to $V_{RESET}$-$V_{SIG}$, wherein $V_{SIG}$ indicates the detected light energy. In the charge storage interval, the control signal RESET is changed to the high voltage level again and the control signals BIAS and AZ are changed to low voltage levels to store the light energy $V_{SIG}$ to the node VG to cause the voltage thereon to increase to $V_{AZ}$+$V_{SIG}$. Meanwhile, if the control signal AZ is kept at the low voltage level to turn off the second transistor SW2, charges stored in the storage capacitor C are substantially kept constant.

In FIG. 4A, the reset interval, the charge transfer interval and the charge storage interval as a whole is used as an energy storage interval $T_{SA}$ of the first temporal circuit 2a or an energy storage interval $T_{SB}$ of the second temporal circuit 2b. Before the operation circuit 12 starts to operate, the first temporal circuit 2a and the second temporal circuit 2b sequentially store light energy detected by the photodiode PD. As shown in FIG. 4A, till the PW convert interval is entered after the operation starts, the first light energy $V_{SIG1}$ in the first temporal circuit 2a is converted to the first detection signal A and the second light energy $V_{SIG2}$ in the second temporal circuit 2b is converted to the second detection signal B.

In the PW convert interval, the control signal BIAS uses a ramp signal having the voltage level decreasing with time. When the control signal BIAS starts at a high voltage level (e.g., $V_{BIAS\_AZ}$), the current I1 flowing through the first transistor SW1 is smaller than the current I3 flowing through the third transistor SW3 to cause an output voltage of Vx to have a low voltage level. With the level decreasing of the control signal BIAS, the current I1 is increasing correspondingly, and when the current I1 is substantially identical to the current I3, the output voltage of Vx changes to a high voltage level to form a negative PW signal. After the output voltage of Vx passes an inverter INV, a positive PW signal is generated as shown in FIG. 4A, wherein a pulse width ΔT is positively related to the light energy $V_{SIG}$. In this way, the temporal circuits 2a and 2b of the present disclosure convert light energy detected by the photodiode PD to a timing signal to be operated by the operation circuit 12.

Please referring to FIG. 4B, it is an operational timing diagram of the pixel circuit 200 in FIG. 2. The first temporal circuit 2a stores first light energy $V_{SIG1}$ in the first capacitor C1 in the first interval (e.g., the energy storage interval $T_{SA}$) using the operation of FIG. 4A. The second temporal circuit 2b stores second light energy $V_{SIG2}$ in the second capacitor C2 in the second interval (e.g., the energy storage interval $T_{SB}$) using the operation of FIG. 4A. Next, in the first operation interval $T_{O1}$, the first temporal circuit 2a uses a ramp signal having the voltage level decreasing with time as the control signal BIAS1 to convert the first light energy $V_{SIG1}$ into a first detection signal A; meanwhile, the second temporal circuit 2b uses a ramp signal having the voltage level decreasing with time as the control signal BIAS2 to convert the second light energy $V_{SIG2}$ into a second detection signal B. Preferably, the ramp signals BIAS1 and BIAS2 are substantially in-phase to generate detection signals A and B substantially at the same time, but not limited thereto. It is possible that detection signals A and B are generated sequentially depending on the operation of the operation circuit 12. The operation circuit 12 performs the numerical calculation on the first detection signal A and the second detection signal B in the first operation interval $T_{O1}$, e.g., the summation, subtraction and absolute differencing given in the present disclosure, but the present disclosure is not limited to these operations.

As shown in FIG. 4B, in the first operation interval $T_{O1}$, the first interval $T_{SA}$ for storing the first light energy $V_{SIG1}$ is prior to the second interval $T_{SB}$ for storing the second light energy $V_{SIG2}$.

In one aspect, after the first operation interval $T_{O1}$ is over, the second temporal circuit 2b continuously holds the second light energy $V_{SIG2}$, but the first temporal circuit 2a stores a next first light energy $V_{SIG1}'$ in the first capacitor C1 in a next energy storage interval $T_{SA}'$ also using the operation of FIG. 4A. Next, in a second operation interval $T_{O2}$, the first temporal circuit 2a uses a ramp signal having the voltage level decreasing with time as the control signal BIAS1 to convert the first light energy $V_{SIG1}'$ into a first detection signal A'; meanwhile, the second temporal circuit 2b uses a ramp signal having the voltage level decreasing with time as the control signal BIAS2 to convert the second light energy $V_{SIG2}$ into a second detection signal B, which is substantially identical to that generated in the first operation interval $T_{O1}$. The operation circuit 12 performs the numerical calculation on the first detection signal A' and the second detection signal B in the second operation interval $T_{O2}$. In the second operation interval $T_{O2}$, the first interval $T_{SA}'$ for storing the first light energy $V_{SIG1}'$ is behind the second interval $T_{SB}$ for storing the second light energy $V_{SIG2}$.

In the next energy storage interval, the first light energy $V_{SIG1}'$ in the first temporal circuit 2a is maintained, but the second light energy in the second temporal circuit 2b is updated to $V_{SIG2}'$. By alternatively updating the light energy stored in the first temporal circuit 2a and the second temporal circuit 2b as shown in FIG. 4B, it is possible to perform the numerical calculation on signals of different time intervals.

Please referring to FIG. 5, it is a circuit diagram of a subtraction circuit 500 according to one embodiment of the present disclosure, which has two inputs respectively coupled to the first temporal circuit 2a and the second temporal circuit 2b to respectively receive a first detection signal A having a first pulse width T1 and a second detection signal B having a second pulse width T2. The subtraction circuit 500 includes an operation capacitor Co and cascaded first operation transistor SWA and second operation transistor SWB, wherein the operation capacitor Co is connected between the first operation transistor SWA and the second operation transistor SWB. The first operation transistor SWA is used as a switch to control a charging interval of a first current Ic to charge the operation capacitor Co according to the first pulse width T1; and the second operation transistor SWB is used as a switch to control a discharging interval of a second current Id to discharge the operation capacitor Co according to the second pulse width T2, wherein the first current Ic is substantially identical to the second current Id. In this way, the subtraction circuit 500 performs the numerical calculation of A-B. It is appreciated that when the subtraction circuit 500 performs the numerical calculation of B-A, gates of the first operation transistor SWA and the second operation transistor SWB receive opposite input signals, e.g., implemented by using a switching device or a multiplexer.

Please referring to FIG. 6, it is a circuit diagram of an addition circuit 600 according to one embodiment of the present disclosure, which has two inputs respectively coupled to the first temporal circuit 2a and the second temporal circuit 2b to respectively receive a first detection signal A having a first pulse width T1 and a second detection signal B having a second pulse width T2. The addition circuit 600 includes an operation capacitor Co and a first operation transistor SWA and a second operation transistor SWB connected in parallel, wherein the operation capacitor Co is connected between the first operation transistor SWA and the second operation transistor SWB. The first operation transistor SWA is used as a switch to control a first charging interval of a first current Ic1 to charge the operation capacitor Co according to the first pulse width T1; and the second operation transistor SWB is used as a switch to control a second charging interval of a second current Ic2 to charge the operation capacitor Co according to the second pulse width T2, wherein the first current Ic1 is substantially identical to the second current Ic2. In this way, the addition circuit 600 performs the numerical calculation of A+B.

Referring to FIG. 7, it is a circuit diagram of an absolute difference circuit 700 according to one embodiment of the present disclosure, which has two input sets respectively coupled to the first temporal circuit 2a and the second temporal circuit 2b to respectively receive first detection signals A and Abar having a first pulse width T1 and second detection signals B and Bbar having a second pulse width T2, wherein Abar and Bbar are generated from A and B using the inverter or vice versa. When the first pulse width T1 is larger than the second pulse width T2, the first input set (including operation transistors SWA and SWBbar) receives the pulse width signals A and Bbar to control a first charging interval of a first current Ic1 to charge the operation capacitor Co. When first pulse width T1 is smaller than the second pulse width T2, the second input set (including operation transistors SWB and SWAbar) receives the pulse width signals B and Abar to control a second charging interval of a second current Ic2 to charge the operation capacitor Co. In this way, the absolute difference circuit 700 performs the numerical calculation of |A−B|.

Although the current sources in FIGS. 5-7 are shown to be implemented by controlling a transistor using a control signal PBIAS, but the present disclosure is not limited thereto. Other current sources may be used.

Figure 8:
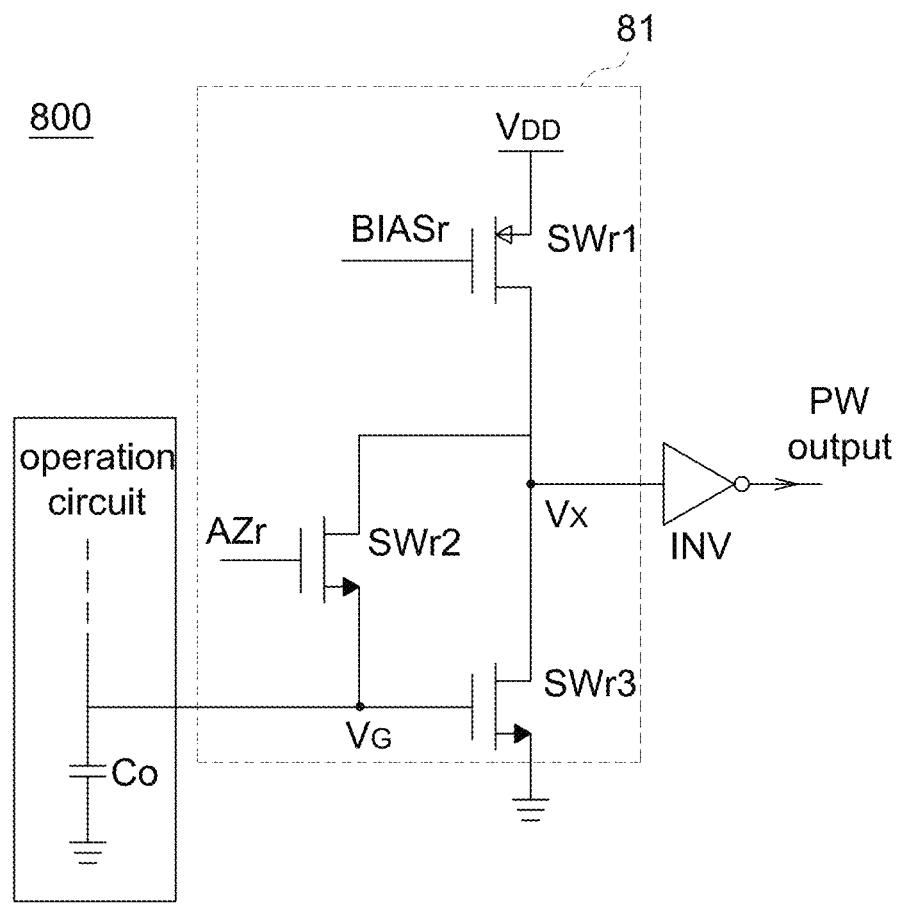
FIG. 8 is a circuit diagram of a recursive circuit of a pixel circuit according to one embodiment of the present disclosure.

Please referring to FIG. 8, it is a circuit diagram of a recursive circuit 800 of a pixel circuit according to one embodiment of the present disclosure. The recursive circuit 800 is coupled to the operation circuit 12 and used to control the operation timing of the operation circuit 12 and convert the operation result (i.e. charges stored in the operation capacitor Co) into a pulse width signal again for the next operation, e.g., the PW output of the recursive circuit 800 being coupled to one signal input of the operation circuit 12 as the signal A or B in FIGS. 5 to 7.

The recursive circuit 800 includes a first recursive transistor SWr1, a second recursive transistor SWr2 and a third recursive transistor SWr3, which have identical connection as the first transistor SW1, the second transistor SW2 and the third transistor SW3 in FIG. 3.

In FIG. 8, the circuit in a dashed block 81 is referred to a voltage-temporal conversion circuit which is used to convert a voltage on the operation capacitor Co to a PW signal similar to A and B, wherein the operation capacitor Co in FIG. 8 is the operation capacitor Co in FIGS. 5 to 7.

Figure 9:
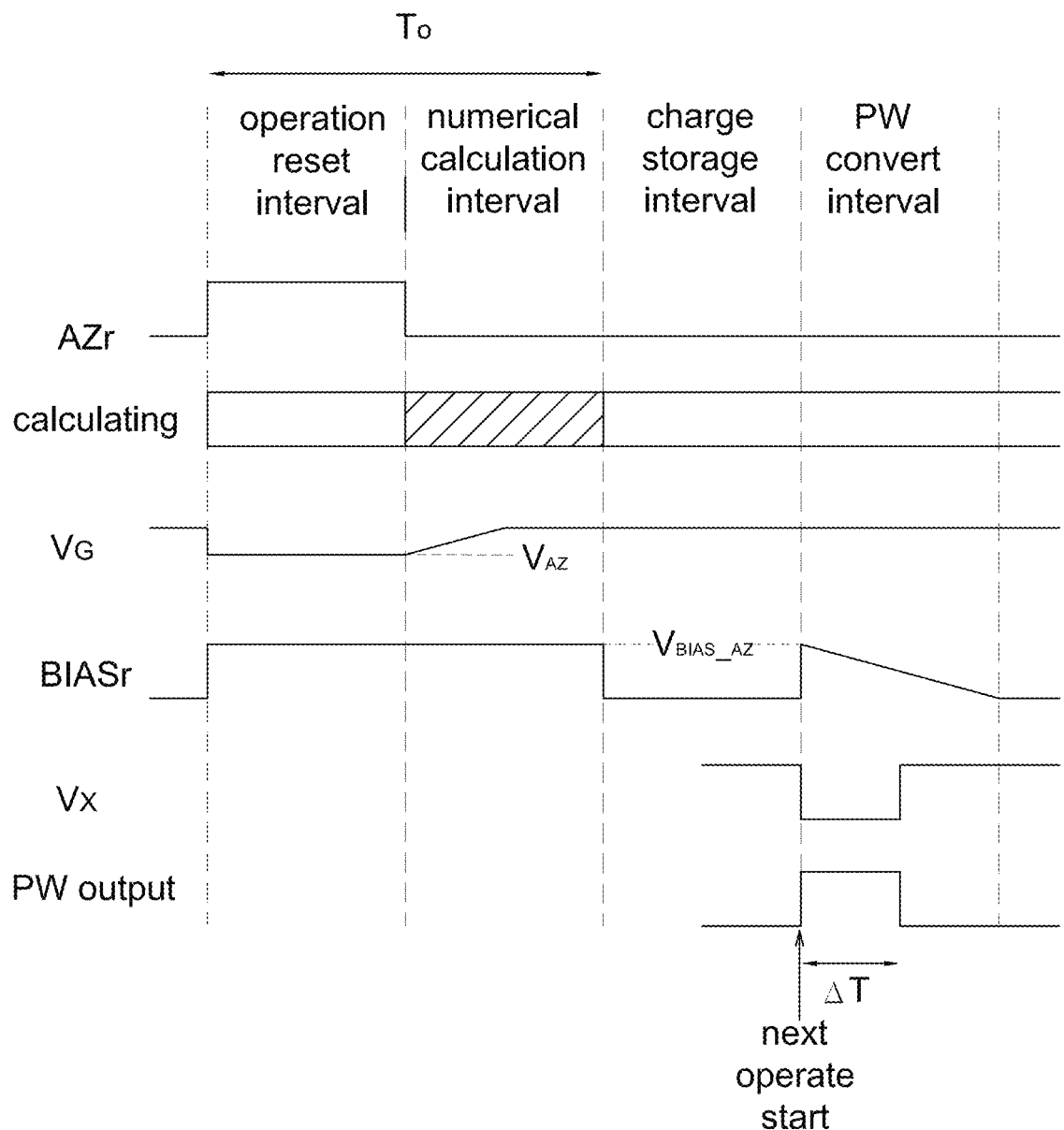
FIG. 9 is an operational timing diagram of the recursive circuit in FIG. 8.

Please referring to FIG. 9 together, it is an operational timing diagram of the recursive circuit 800 in FIG. 8. Before the operation capacitor Co starts to perform the numerical calculation on the detection signal A from the first temporal circuit 2a and the second detection signal B from the second temporal circuit 2b, the operation capacitor Co is reset at first. In the operation reset interval, control signals AZr and BIASr are respectively changed to a high voltage level for resetting a voltage of the operation capacitor Co to $V_{AZ}$. In this aspect, the second recursive transistor SWr2 is used as an operation reset transistor so as to reset the voltage of the operation capacitor Co in the operation reset interval. In the numerical calculation interval (e.g., slant-lines region), the control signal AZr is changed to a low voltage level and the operation result of the operation circuit 12 is stored in the operation capacitor Co to change a voltage thereon, wherein magnitude of the voltage change is corresponding to the operation result. Next, in the charge storage interval, the operation capacitor Co holds the voltage thereon. Till a next operation starts, the voltage-temporal conversion circuit 81 converts the calculated voltage to a PW signal for the operation of the operation circuit 12. The operations of the charge storage interval and the PW convert interval of the recursive circuit 800 are similar to those of the charge storage interval and the PW convert interval in FIG. 4A, e.g., using a ramp signal to generate the PW signal, and thus details thereof are not repeated herein.

In one aspect, the recursive circuit 800 further includes an inverter INV to invert a phase of the outputted PW signal. However, when the operation circuit 12 includes an inverter therein, the recursive circuit 800 does not include the inverter INV.

In the present disclosure, the PW convert interval of FIG. 4A as well as the operation reset interval and the numerical calculation interval of FIG. 9 as a whole is referred to an operation interval $T_O$ herein, wherein the operation reset interval of FIG. 9 is performed in parallel with or behind the PW convert interval of FIG. 4A.

It is appreciated that if there is no next operation after the recursive circuit 800, the recursive circuit 800 directly provides (e.g., controlled by a switching device) the calculated voltage on the operation capacitor Co to the identify circuit 14 for identification, e.g., compared with a reference voltage using a comparator.

The circuit in FIG. 8 is called recursive circuit because the operation result of the operation circuit 12 may be stored and then converted to a PW signal multiple times by the recursive circuit 800 to perform multiple recursive operations. That is, the operation circuit 12 not only calculates the detected result of the photodiode PD, but also calculates the operation result thereof with the operation result of other pixels.

In this way, by using the pixel circuit 200 of FIG. 2 in conjunction with the recursive circuit 800 of FIG. 8, it is possible to perform various pixel-wise operations on the pixel data for various applications. The identify circuit 14 performs various identifications according to a final operation result of the pixel circuit 20 and the recursive circuit 800, e.g., identifying the lift-up of a navigation device, calculating the navigation vector, performing image recognition, categorizing images, performing motion detection and performing multi-layer neural network so as to realize the pixel structure with pixel-wise operation.

Figure 10:
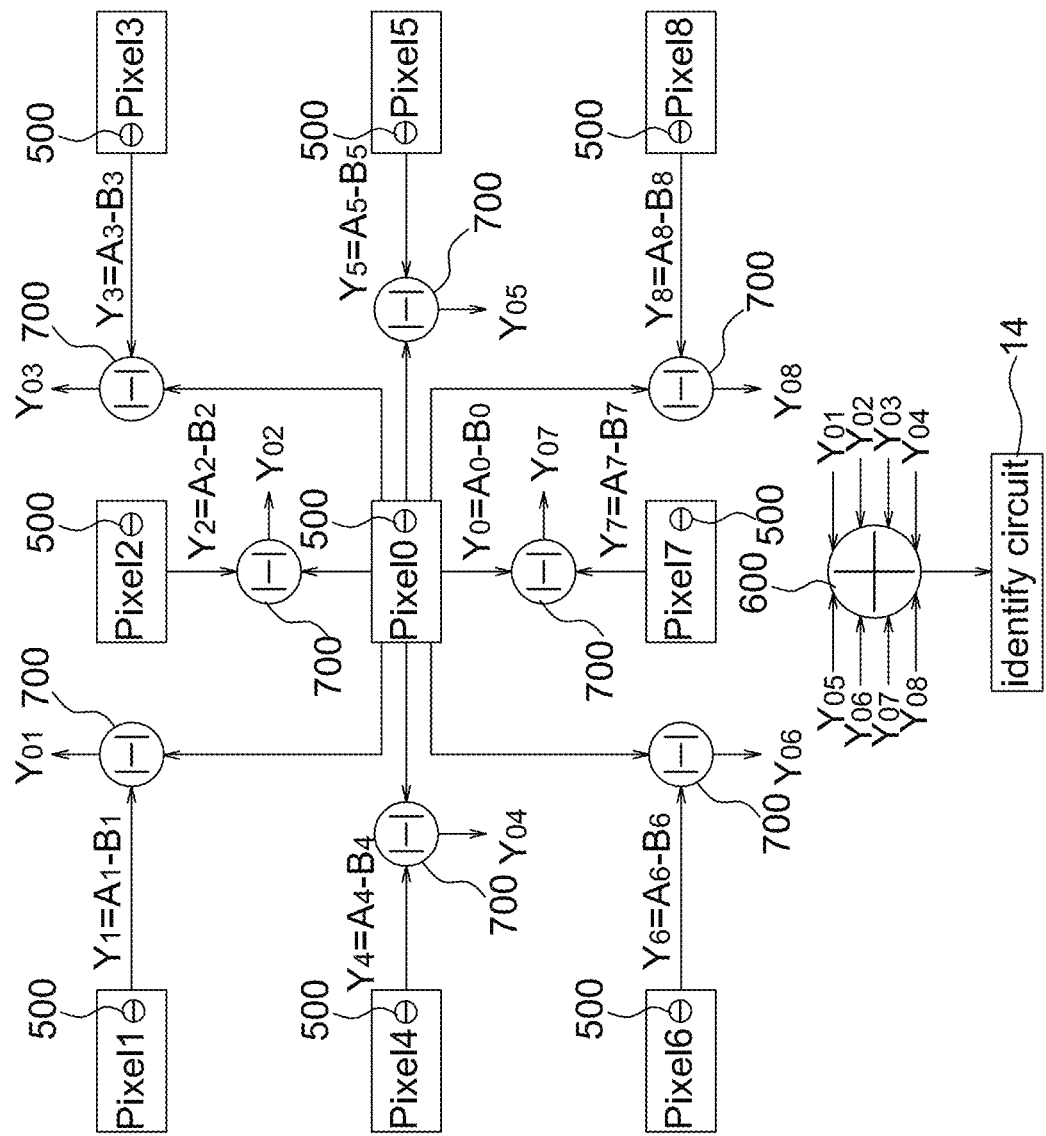
FIG. 10 is a schematic diagram of one application of a pixel circuit according to one embodiment of the present disclosure.

For example referring to FIG. 10, it is a schematic diagram of one application of the pixel circuit of the present disclosure that performs the motion detection (e.g., adapted to a security system). A pixel array of a camera includes multiple pixels arranged in an array. The identify circuit 14 performs the motion detection according to 9 adjacent pixels, including pixel 0 to pixel 8, wherein the pixel 0 is a central pixel of pixel 1 to pixel 8. In this aspect, the pixels 0 to 8 respectively include the pixel circuit 200 in FIG. 2 and/or at least one operation circuit 12.

As mentioned above, pixels 0 to 8 respectively generate a first detection signals A0 to A8 and second detection signals B0 to B8. After the subtraction circuit 500 (e.g., included in the pixel circuit of pixels 0 to 8, but not limited to) performs the numerical calculation on the first detection signals A0 to A8 and the second detection signal B0 to B8 of the pixels 0 to 8, the subtracted result Y0 to Y8 are obtained and stored in the corresponding operation capacitor Co (e.g., shown in FIG. 8), wherein Y0 to Y8 indicate that each of pixels 0 to 8 performs the temporal difference operation on detected signals obtained in different detection intervals to represent the brightness variation detected by every pixel.

Next, after converting Y0 to Y8 to PW signals using the recursive circuit 800, the absolute difference circuit 700 performs the numerical calculation of absolute differencing between Y0 and Y1, Y0 and Y2 . . . . Y0 and Y8 to obtain Y01 to Y08, wherein Y01 to Y08 indicate that the pixel array performs the spatial difference operation between different pixels, and Y01 to Y08 contain the operation result of both the temporal difference and spatial difference.

Finally, Y01 to Y08 are summed by the addition circuit 600. Similarly, Y01 to Y08 are firstly stored in the corresponding operation capacitor Co, and then converted to PW signals by the voltage-temporal conversion circuit 81 for the summation of the addition circuit 600.

In one aspect, the addition circuit 600 includes two inputs as shown in FIG. 6, and the addition circuit each time performs the summation of two of Y01 to Y08 that is stored and voltage-temporal converted, and then summed with another one of the rest of Y01 to Y08 till all of Y01 to Y08 is added together.

In another aspect, the addition circuit includes 8 inputs and uses the pulse widths associated with Y01 to Y08 to control the charging intervals of respective current sources as a way of adding Y01 to Y08 together.

The identify circuit 14 receives a summation of the addition circuit 600, and compares the summation with a predetermined threshold (e.g., using a comparator). When the summation of Y01 to Y08 is larger than or equal to the predetermined threshold, it means that a motion is detected.

The identify circuit 14 then outputs a control signal to perform corresponding controls, e.g., turning on a light source, starting to record images or increasing image capture frequency.

In another aspect, the identify circuit 14 receives a summation of the temporal differences Y0 to Y8 (e.g., Y0 to Y8 directly outputted to the addition circuit 600 from pixels 0 to 8). When the summation is larger than or smaller than (determined according to the light source arrangement) a brightness threshold, it means that a mouse device is lifted up by a user.

It is appreciated that although FIG. 10 uses 9 neighboring pixels to detect the temporal and spatial brightness variation to perform the motion detection or lift-up detection, the present disclosure is not limited thereto. The identify circuit 14 uses a proper number of pixels to detect the temporal and spatial brightness variation, e.g., the proper number being determined according to environment to be detected and a size of pixel array.

In the above embodiments, two temporal circuits are arranged in the pixel circuit to alternatively output a detected signal having a pulse width corresponding to the latest light energy detected in successive exposure intervals.

In the embodiments below, a pixel circuit (e.g., indicated by 1300 in FIG. 13) selects to output image data, time difference data or a state-change signal according to control signals of a control circuit (e.g., indicated by 120 in FIG. 12) and an input signal of a comparator is further provided.

Figure 11:
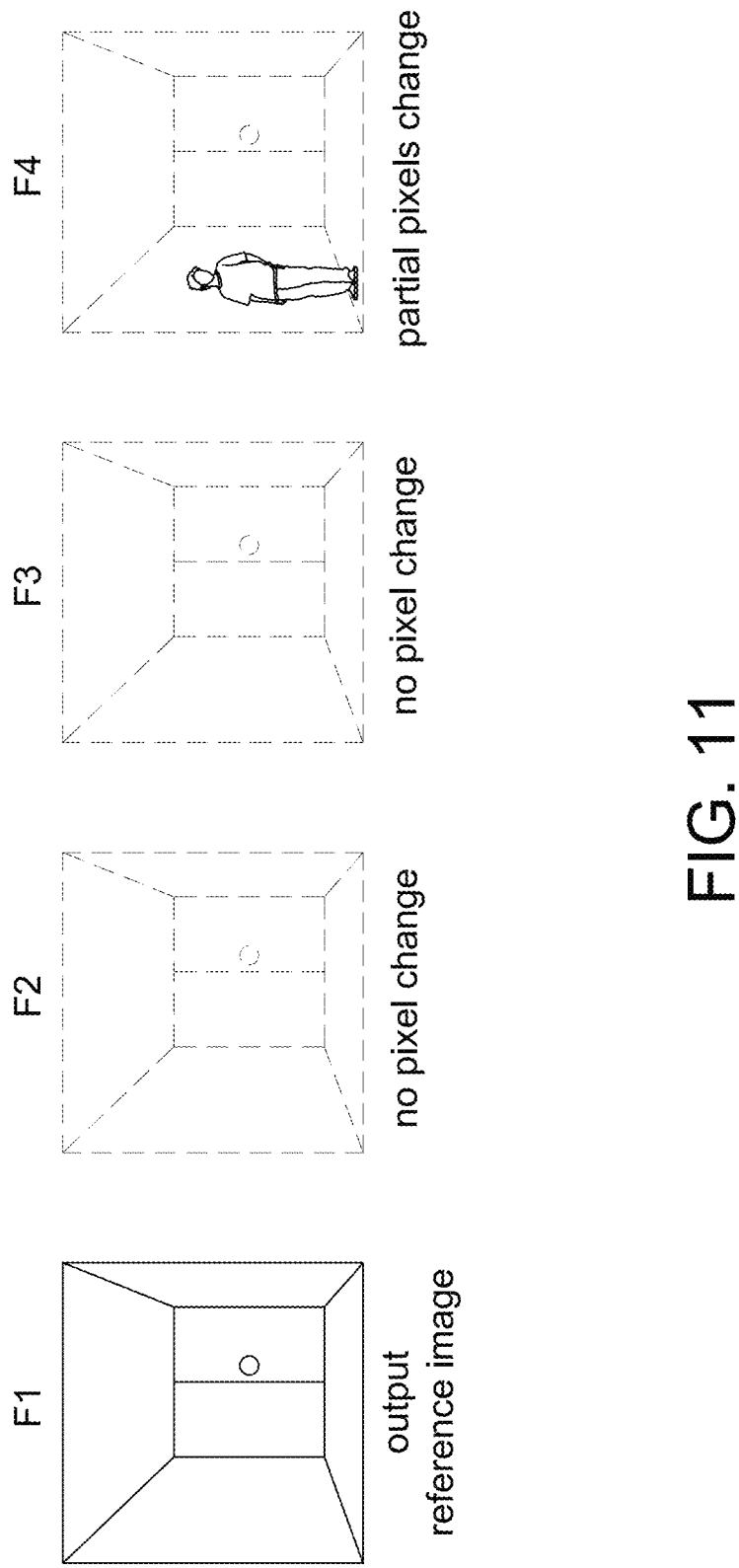
FIG. 11 is a schematic diagram of capturing image frames using an optical sensor including pixel circuits of the present disclosure.

Please refer to FIG. 11, it shows four image frames F1 and F4 successively captured by an optical sensor which includes the pixel circuit 1300 of the present disclosure. For example, the image frame F1 is the first image frame captured when the optical sensor is activated or woken up, and pixel data of all pixel circuits 1300 (e.g., each rectangle in FIG. 12 indicating one pixel) is readout to form one reference image to be stored in a backend circuit or device. In capturing the image frames F2 and F3 by the optical sensor, if an analog circuit (e.g., arranged in a sensor chip or in the optical sensor) identifies that no pixel has a change (i.e. not detecting enough light energy variation, e.g., ΔV<variation threshold as mentioned below) according to a state-change signal or time difference data outputted by each pixel circuit 1300, the optical sensor does not output image data of the image frames F2 and F3.

In capturing the image frame F4, when the analog circuit identifies that a part of pixels have a change (e.g., a part of pixel circuits 1300 detecting a human body) according to the state-change signal or time difference data outputted by each pixel circuit 1300, the readout circuit 122 then reads gray levels of the part of pixels having a change as the image data.

That is, in the image frames F1 to F4 of FIG. 11, only pixel circuits corresponding to solid lines output image data to backend circuit or device.

Figure 12:
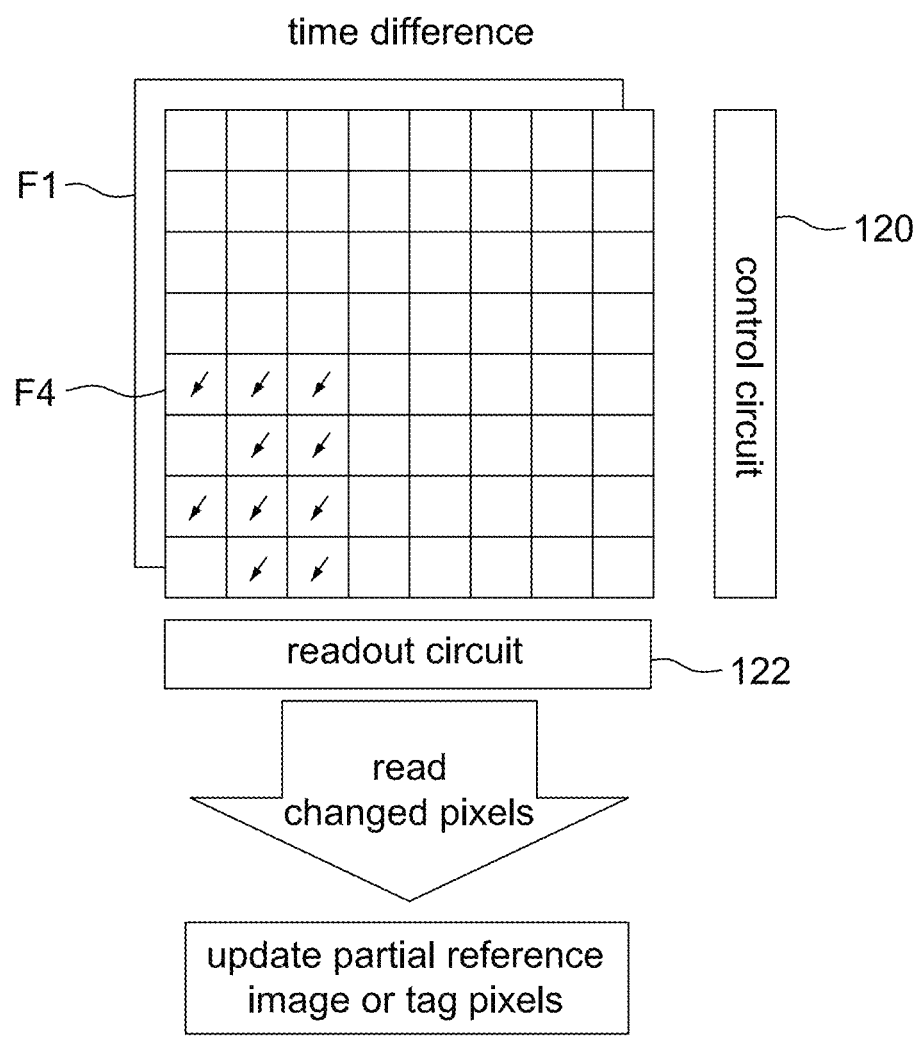
FIG. 12 is a schematic diagram of a part of pixels of an image frame captured by an optical sensor including pixel circuits of the present disclosure having a light energy variation.

Please refer to FIG. 12, it shows that only pixel circuits 1300 indicated by an arrow detect light energy variation between the image frames F1 and F4, as mentioned above no light energy variation being detected between F1 and F2 or between F1 and F3. Therefore, the readout circuit 122 only reads image data of the pixel circuits 1300 indicated by an arrow in FIG. 12. The backend circuit or device (e.g., host) updates the stored reference image therein according to the read image data or tags the pixels indicated by an arrow in FIG. 12, wherein how the backend circuit or device using the image data, time difference data or state-change signal outputted by every pixel circuit 1300 is determined according to different applications, and is not limited to those mentioned herein.

Figure 13:
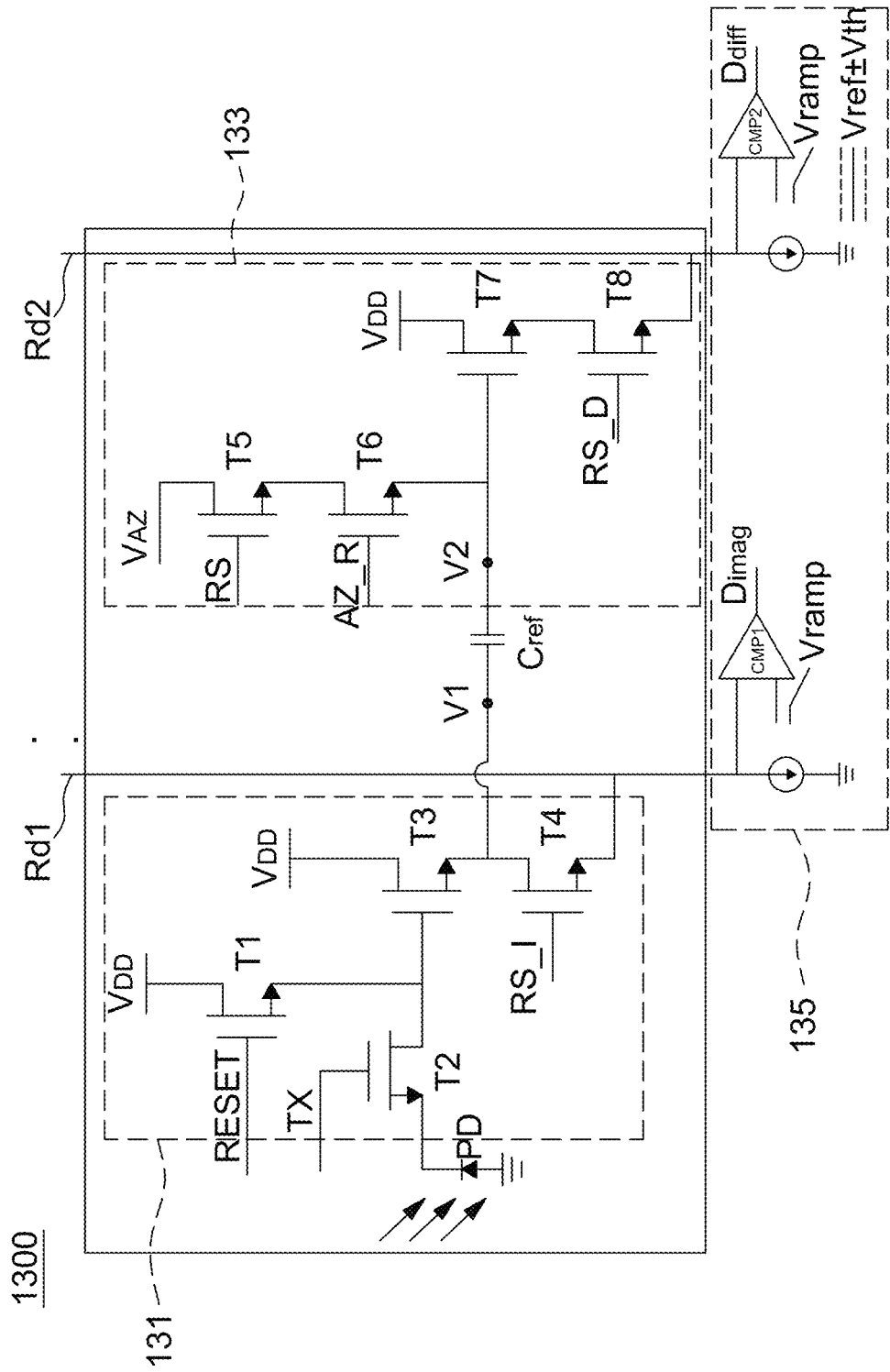
FIG. 13 is a circuit diagram of a pixel circuit according to one embodiment of the present disclosure.

Please refer to FIG. 13, it is a circuit diagram of a pixel circuit 1300 according to one embodiment of the present disclosure. The pixel circuit 1300 includes a photodiode PD, a storage capacitor Cref, an image circuit 131, a difference circuit 133 and a sharing circuit 135, wherein the sharing circuit 135 is shared by the pixel circuit 1300 with other pixel circuits, which are multiple pixel circuits at a same column of a pixel array (e.g., pixel array corresponding to image frames F1 and F4 in FIG. 12) as the pixel circuit 1300.

It should be mentioned that although the image circuit 131 and the difference circuit 133 both output voltage values, the voltage value outputted by the image circuit 131 is image data associated with light energy generated in a first interval (e.g., $T_{SA}$ of FIG. 4B) by the photodiode PD; and the voltage value outputted by the difference circuit 133 is time difference data associated with a variation of light energy generated between the first interval $T_{SA}$ and a second interval (e.g., $T_{SB}$ of FIG. 4B) by the photodiode PD. That is, in the present disclosure, the image data is referred to detected light energy of the photodiode PD in a single exposure interval, and the time difference data is referred to a difference or variation of detected light energy of the photodiode PD between two exposure intervals. Accordingly, the pixel circuit 1300 is able to perform the time difference detection or simply output pixel data.

The storage capacitor Cref has a first end (e.g., left end in FIG. 13) connected to a first node V1, and a second end (e.g., right end in FIG. 13) connected to a second node V2.

The image circuit 131 is connected to the first end of the storage capacitor Cref and is a 4-transistor pixel circuit, e.g., including a first reset transistor T1, a transfer transistor T2, a first source follower T3 and a first output transistor T4, which are all NMOS transistors.

The transfer transistor T2 is connected between the photodiode PD and the first end of the storage capacitor Cref, and is used to transfer light energy generated by the photodiode PD to the storage capacitor Cref according to a control signal TX.

The first reset transistor T1 has a source connected between the transfer transistor T2 and the first end of the storage capacitor Cref and has a drain connected to a voltage source $V_{DD}$. The first reset transistor T1 is conducted to reset a voltage at the first node V1 according to a control signal RESET.

The first output transistor T4 is connected between the first end of the storage capacitor Cref and a first readout line Rd1, and is used to output the voltage at the first node V1 to the first readout line Rd1 according to a control signal RS_I, wherein the first readout line Rd1 connects multiple pixel circuits at the same column of a pixel array as the pixel circuit 1300.

The control signals TX, RESET and RS_I are generated, for example, by the control circuit 120. For example, the control circuit 120 controls the pixel array to acquire an image frame using the rolling shutter.

The first source follower T3 is connected between the transfer transistor T2 and the first end of the storage capacitor Cref, and is used to losslessly buffer light energy of the photodiode PD to the storage capacitor Cref.

The difference circuit 133 is connected to the second end of the storage capacitor Cref, and includes a row selection transistor T5, a second reset transistor T6, a second source follower T7 and a second output transistor T8, which are all NMOS transistors.

The row selection transistor T5 is connected between a reset voltage $V_{AZ}$ and the second reset transistor T6, and is conducted according to a row selection signal RS, which is used to determine the row of a pixel array being triggered.

The second reset transistor T6 is cascaded to the row selection transistor T5 via a drain thereof, and has a source connected between the second end of the storage capacitor Cref and the second output transistor T8, and is used to reset the second end of the storage capacitor Cref to a reset voltage Vaz according to a control signal AZ_R, which is used to determine the column of a pixel array being triggered.

The second output transistor T8 is connected between the second end of the storage capacitor Cref and a second readout line Rd2, and is used to output a voltage at the second node V2 to the second readout line Rd2 according to a control signal RS_D, wherein the second readout line Rd2 connects multiple pixel circuits at the same column of a pixel array as the pixel circuit 1300.

The row selection signal RS, as well as the control signals AZ_R and RS_D are generated, for example, by the control circuit 120.

The second source follower T7 is connected between the second end of the storage capacitor Cref and the second output transistor T8, and is used to losslessly buffer a voltage at the second node V2 to the second readout line Rd2.

The sharing circuit 135 includes a first comparator CMP1 and a second comparator CMP2.

One input terminal of the first comparator CMP1 is connected to the first readout line RD1, and the first comparator CMP1 is used to output image data $D_{imag}$. For example, the first comparator CMP1 is used to compare a voltage at the first end of the storage capacitor Cref with a ramp signal Vramp to output the image data $D_{imag}$. For example, a single slop ADC is used to generate magnitude of the image data $D_{imag}$, wherein the operation of the single slop ADC is known to the art, and thus details thereof are not described herein. The first comparator CMP1 is shared by the pixel circuit 131 with other pixel circuits via the first readout line Rd1.

One input terminal of the second comparator CMP2 is connected to the second readout line RD2, and the second comparator CMP2 is used to output time difference data $D_{diff}$ or a state-change signal. The second comparator CMP2 is used to compare a voltage at the second end of the storage capacitor Cref with a ramp signal Vramp to output the time difference data $D_{diff}$. Or, the second comparator CMP2 is used to sequentially compare a voltage at the second end of the storage capacitor Cref with an upper threshold voltage (e.g. Vref+Vth) and a lower threshold voltage (e.g., Vref−Vth) to output a state-change signal. More specifically, when the voltage at the second node V2 does not exceed a range of Vref±Vth (or called variation threshold), it means that the pixel circuit 1300 does not detect enough light energy variation such that the state-change signal is not generated; whereas when the voltage at the second node V2 exceeds the range of Vref±Vth, it means that the pixel circuit 1300 detects enough light energy variation such that the state-change signal is generated, e.g., pixels indicated by an arrow in FIG. 12. The second comparator CMP2 is shared by the difference circuit 133 with other pixel circuits via the second readout line Rd2.

In the present disclosure, the state-change signal is sometimes called the time difference data which indicates whether light energy between a first interval and a second interval has enough variation to have the pixel change, as shown in FIGS. 11 and 12.

Please refer to FIG. 14, it is a first operation mode of a pixel circuit 1300 according to one embodiment of the present disclosure, in which the pixel circuit 1300 outputs image data $D_{imag}$. For example, the first operation mode is a mode for a 4-T pixel circuit to output image data, and includes an exposure interval in first column, a reset interval in second column, a charge transfer interval in third column and a readout interval in fourth column of FIG. 14.

The exposure interval is an interval to expose the photodiode PD, and all transistors are not conducted.

The reset interval is to reset a voltage at the first node V1 to Vr by conducting the transistors T1 and T4.

The charge transfer interval is to transfer detected light energy of the photodiode PD to the storage capacitor Cref by conducting the transistors T2 and T4 such that the voltage at the first node changes to Vs containing charges dumped from the photodiode PD.

The readout interval is to couple the voltage Vs at the first node V1 to an input terminal of the first comparator CMP1 by conducting the transistor T4. The voltage Vs is compared with a ramp signal Vramp to output image data $D_{imag}$.

In the first operation mode, all transistors in the difference circuit 133 are not conducted. It is seen from FIG. 14 that the transistors T5, T6 and T8 are not conducted in every interval. The transistors T3 and T4 are used as source followers instead of switching devices.

Please refer to FIG. 15, it is a second operation mode of a pixel circuit 1300 according to one embodiment of the present disclosure, in which the pixel circuit 1300 outputs time difference data $D_{diff}$. The second operation mode includes a first charge transfer interval in first column, a reset interval in second column, a second charge transfer interval in third column and a readout interval in fourth column of FIG. 15.

The first charge transfer interval is to transfer detected light energy of the photodiode PD in a first interval to the first node V1 to form a voltage Vold, wherein the first charge transfer interval of FIG. 15 actually includes operating results of the exposure interval, the reset interval and the charge transfer interval of FIG. 14, i.e. Vold=Vs. For simplification, FIG. 15 only shows the charge transfer interval.

The reset interval is to reset a voltage at the second node V2 to Vaz by conducting the transistors T5, T6 and T8. Meanwhile, in order not to change the voltage Vold at the first node V1, the transistor T4 is also conducted.

The second charge transfer interval is to transfer detected light energy of the photodiode PD in a second interval to the first node V1 to form a voltage Vold+ΔV, wherein the second charge transfer interval in FIG. 15 actually includes operating results of the exposure interval and charge transfer interval of FIG. 14. Meanwhile, since the transistors T5, T6 and T8 are not conducted, the voltage at the second node V2 also has a voltage variation ΔV to become Vaz+ΔV.

Because the image circuit 131 is to generate a variation of detected light energy between the first interval and the second interval, the image circuit 131 is not reset between the first interval and the second interval, or between the first charge transfer and the second charge transfer.

The readout interval is to couple the voltage Vaz+ΔV at the second node V2 to an input terminal of the second comparator CMP2 by conducting the transistor T8. The voltage Vaz+ΔV is compared with a ramp signal Vramp to generate time difference data $D_{diff}$. The time difference data $D_{diff}$ is also the digital data generated by the single slope ADC. In one aspect, the voltage Vold+ΔV at the first node V1 is coupled to an input terminal of the first comparator CMP1 by conducting the transistor T4, and the voltage Vold+ΔV is compared with a ramp signal Vramp to output image data.

Figure 16B:
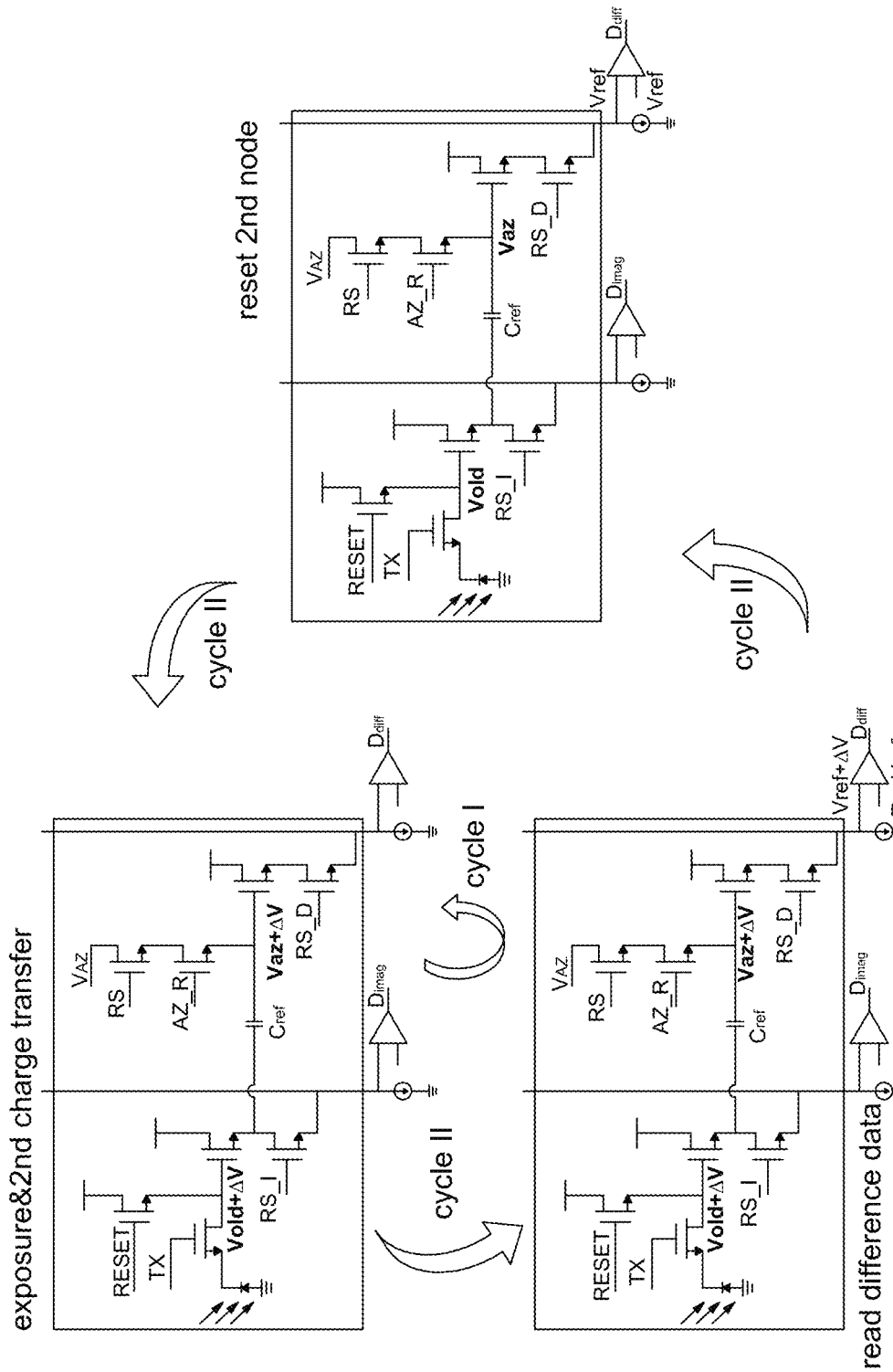

Please refer to FIGS. 16A and 16B, it is a third operation mode of a pixel circuit 1300 according to one embodiment of the present disclosure, in which an analog circuit of the optical sensor identifies whether to output time difference data $D_{diff}$ to backend circuit or device according to the time difference data $D_{diff}$ of the difference circuit 133.

It should be mentioned that the second charge transfer interval in first column of FIG. 16A is the second charge transfer interval of FIG. 15. That is, before the second charge transfer interval, the third operation mode further includes the first charge transfer interval and the reset interval of FIG. 15, and FIGS. 16A and 16B mainly show the operation of a cycle I and a cycle II for simplification purposes.

The cycle I of FIG. 16B is to identify (e.g., by analog circuit) that whether the time difference data $D_{diff}$ exceeds a variation threshold. As mentioned above, the present disclosure is to identify magnitude of the time difference data $D_{diff}$ according to the conversion result of the single slope ADC.

In the read difference data interval in second column, if the time difference data $D_{diff}$ does not exceed a predetermined variation threshold, the process returns to the second charge transfer interval to accumulate the voltage variation of a next exposure interval, e.g., the voltage at the first node V1 changes from Vold+$\Delta$V to Vold+2$\Delta$V or Vold+$\Delta$V+$\Delta$V'.

In the read difference data interval, if the time difference data $D_{diff}$ exceeds the predetermined variation threshold, the cycle II is performed, i.e. resetting the second node V2 as in third column of FIG. 16A after reading the time difference data $D_{diff}$. The voltage at the second node V2 is reset to Vaz, and the voltage at the first node is changed to Vold (FIG. 16A showing new Vold since it is formed within different time interval).

In the third operation mode, the analog circuit identifies whether to output time difference data $D_{diff}$ according to magnitude of the time difference data $D_{diff}$. The time difference data $D_{diff}$ outputted in the read difference data interval is sent to the backend circuit or device, which uses the time difference data $D_{diff}$ in different ways according to different requirements.

Figure 17B:
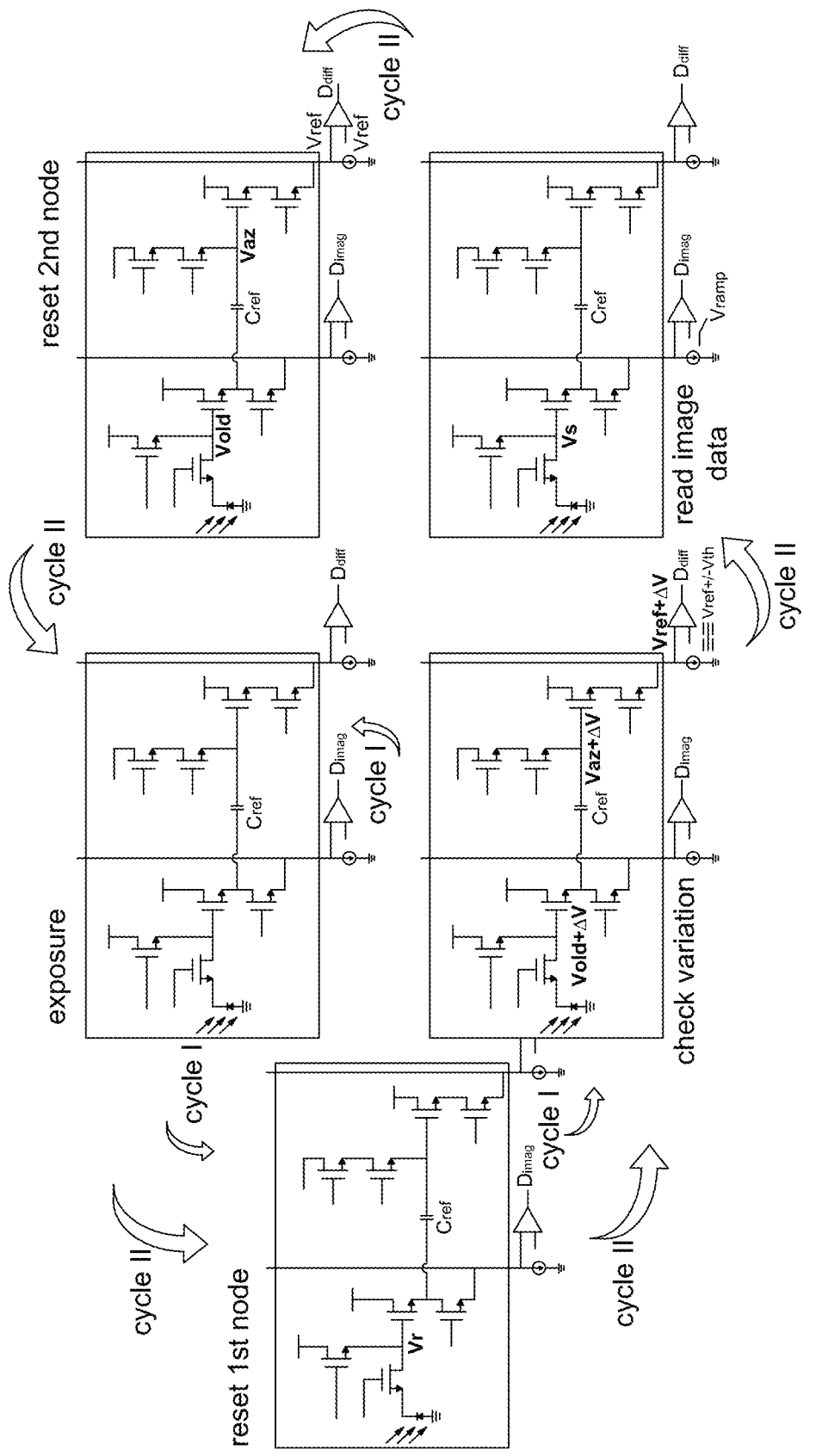

Please refer to FIGS. 17A and 17B, it is a fourth operation mode of a pixel circuit 1300 according to one embodiment of the present disclosure, in which an analog circuit of the optical sensor identifies whether to control the image circuit 131 to output image data according to whether the difference circuit 133 outputs a state-change signal. It should be mentioned that some operation intervals of FIGS. 17A and 17B may include other operations, but for simplification purposes, only representative operation intervals are shown in FIGS. 17A and 17B.

As mentioned above, the analog circuit identifies whether a state change occurs in an output signal of the second comparator CMP2, which sequentially compares the time difference data $D_{diff}$ (i.e. voltage at the second node V2) with an upper threshold voltage Vref+Vth and a lower threshold voltage Vref-Vth.

The exposure interval in first column and the reset first node interval in second column of FIG. 17A are identical to those of FIG. 14, and thus details thereof are not repeated herein. The charge transfer & check variation interval in third column of FIG. 17A includes the first charge transfer interval, the reset second node interval and the second charge transfer interval of FIG. 15 to cause a voltage at the first node V1 to change to Vold+$\Delta$V, and a voltage at the second node V2 to change to Vaz+$\Delta$V. Then, the second comparator CMP2 compares the Vref+$\Delta$V (i.e. time difference data Vaz+$\Delta$V passing T7 and T8) with the upper threshold voltage Vref+Vth and the lower threshold voltage Vref-Vth.

If the second comparator CMP2 fails to output a state-change signal (i.e. time difference data not exceeding variation threshold), the pixel circuit 1300 does not output image data $D_{imag}$. That is, in FIG. 17B, if the second comparator CMP2 does not output a state-change signal, the process enters a cycle I to perform a new exposure, and the readout circuit 122 does not read image data of the pixel circuit 1300, e.g., pixels not indicated by an arrow in FIG. 12.

The cycle I is to repeatedly perform the intervals of exposure, reset first node and check variation, and the second end of the storage capacitor Cref (i.e. second node V2) is not reset before a next exposure interval.

When the second comparator CMP2 outputs a state-change signal (i.e. time difference data exceeding variation threshold), a cycle II is entered. In the cycle II, the readout circuit 122 reads image data $D_{imag}$ (e.g., shown as Vs) of the image circuit 1300. As mentioned above, the conversion result of the single slope ADC is treated as the image data $D_{imag}$ by the backend circuit or device. Then, a new exposure is performed after resetting the second node V2.

In the fourth operation mode, the cycle II is to repeatedly perform intervals of the exposure, reset first node, check variation, read image data and reset second node. The control of transistors in every interval is shown in FIG. 17A.

Figure 18B:
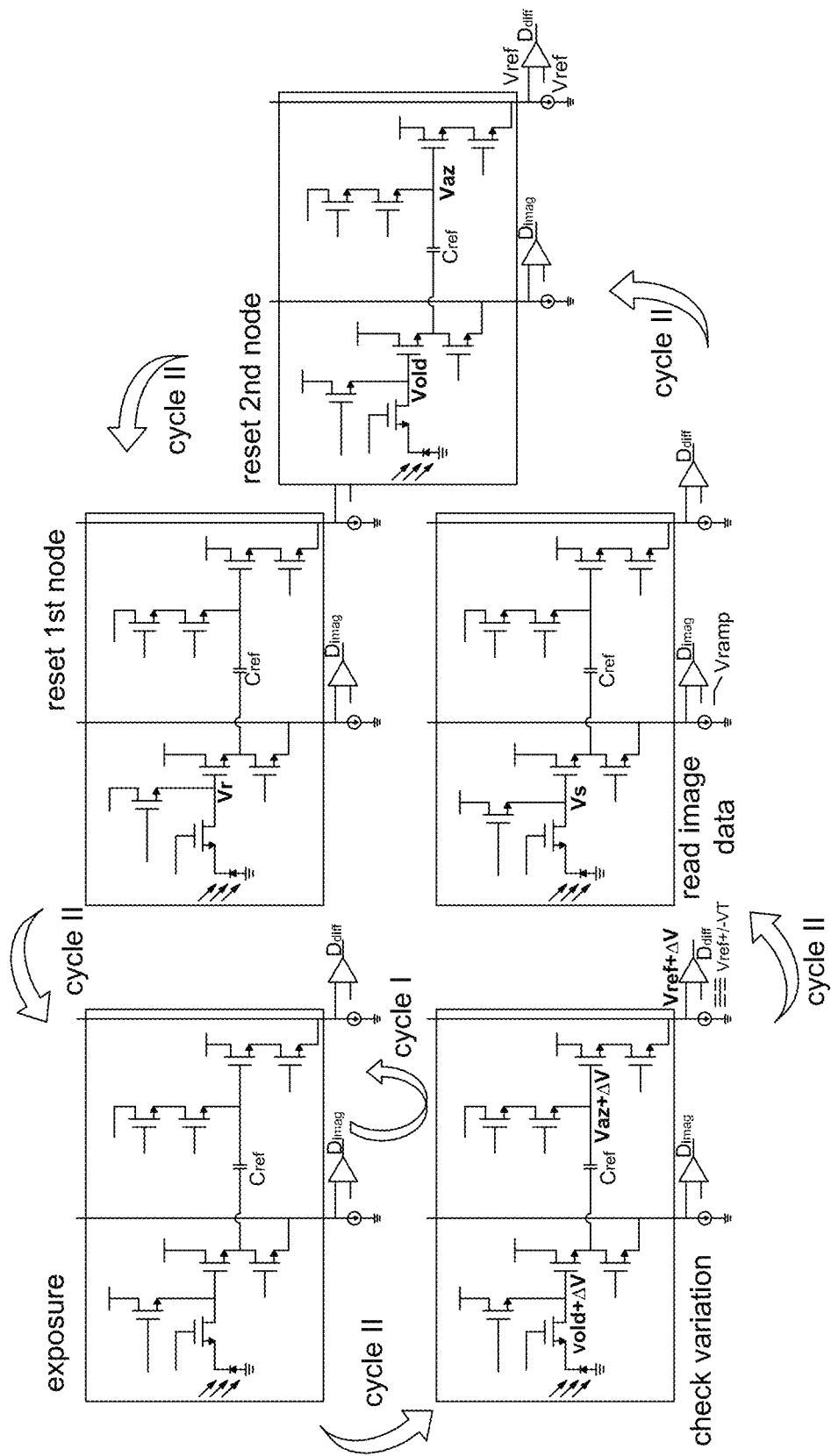

Please refer to FIGS. 18A and 18B, it is a fifth operation mode of a pixel circuit 1300 according to one embodiment of the present disclosure, in which an analog circuit arranged in the optical sensor identifies whether to control the image circuit 131 to output image data $D_{imag}$ according to whether the difference circuit 133 outputs a state-change signal.

The fifth operation mode also includes intervals of the exposure in first column, check variation in second column, read image data in third column, reset second node in fourth column and reset first node in fifth column. The difference from the fourth operation mode is that in the fifth operation mode the reset first node is executed in the cycle II, i.e. the first end of the storage capacitor Cref (i.e. first node V1) is reset only when the second comparator CMP2 outputs a state-change signal. Other parts are similar to the fourth operation mode.

In the fifth operation mode, the cycle I repeatedly performing intervals of the exposure and check variation; and the cycle II repeatedly performing intervals of the exposure, check variation, read pixel data, reset second node and reset first node. The control of transistors in every interval is shown in FIG. 18A.

It should be mentioned that for simplification purposes, FIGS. 17B and 18B omits control signals, which are already shown in FIGS. 13 and 16B.

The present disclosure further provides an operating method of a pixel array (e.g., referring to FIG. 12) including multiple pixel circuits 1300 of FIG. 13, including the steps of:

Step 1: The analog circuit identifies whether the time difference data $D_{diff}$ of every pixel circuit 1300 of a pixel array exceeds a variation threshold (i.e. a range of ±Vth). In one aspect, the analog circuit identifies according to the time difference data $D_{diff}$ read in FIG. 16B. In another aspect, the analog circuit identifies according to the check variation of FIGS. 17B and 18B, i.e. sequentially comparing, by the second comparator CMP2, the time difference data $D_{diff}$ with an upper threshold Vref+Vth and a lower threshold Vref-Vth to identify whether an output signal from the second comparator CMP2 has a state change so as to identify whether the variation threshold is exceeded.

Step 2: When the time difference data $D_{diff}$ of all of the pixel circuits 1300 of the pixel array does not exceed the variation threshold, the pixel array does not output image data $D_{imag}$, e.g., FIG. 11 showing that image frames F2 and F3 do not have pixel change such that the image data $D_{imag}$ corresponding to the image frames F2 and F3 is not outputted to backend circuit or device.

Step 3: When the time difference data $D_{diff}$ of a part of pixel circuits 1300 of the pixel array exceeds the variation threshold, only the part of pixel circuits 1300 output the image data $D_{imag}$, e.g., FIG. 11 showing that only pixels indicated by an arrow output image data $D_{imag}$ (e.g., executing cycle II in FIGS. 17B and 18B), but the rest pixels do not output image data $D_{imag}$ (e.g., executing cycle I in FIGS. 17B and 18B).

The image data $D_{imag}$ outputted by the part of pixel circuits 1300 is used to update a reference image stored in the backend circuit or device, and the backend circuit or device may tag the part of pixel circuits in the pixel array. As mentioned above, the backend circuit or device uses the time difference data $D_{diff}$, state-change signal and image data $D_{imag}$ according to different applications.

As mentioned above, in the conventional optical sensor, pixel data is converted to digital data at first, and then the digital data is operated by the digital backend such that frame buffers are required to temporarily store frame data. Accordingly, the present disclosure further provides a pixel circuit that outputs pulse width signals for the analog operation (e.g., FIG. 2 and FIGS. 5 to 7). The pixel circuit outputs, within an operation interval, the PW signals corresponding to different detecting intervals for the analog operation of an operation circuit so as to realize the objective of the pixel-wise operation of pixel data.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical sensor comprising:
multiple pixel circuits arranged in a pixel array, each pixel circuit comprising:
a photodiode, configured to generate light energy;
a storage capacitor, having a first end and a second end;
an image circuit, comprising:
a transfer transistor, connected between the photodiode and the first end of the storage capacitor;
a first reset transistor, having a source connected between the transfer transistor and the first end of the storage capacitor; and
a first output transistor, connected between the first end of the storage capacitor and a first readout line; and
a difference circuit, comprising:
a second output transistor, connected between the second end of the storage capacitor and a second readout line; and
a second reset transistor, having a source connected between the second end of the storage capacitor and the second output transistor, configured to reset the second end of the storage capacitor to a reset voltage;

multiple sharing circuits, each shared by the each pixel circuit with other pixel circuits at the same column of the pixel array as the each pixel circuit, and comprising:
a first comparator, connected to the first readout line, and configured to output image data; and
a second comparator, connected to the second readout line, and configured to output time difference data or a state-change signal; and
a readout circuit, configured to
read image data of all the multiple pixel circuits acquired in a first interval via first readout lines to form a reference image, and
read image data, acquired in a second interval via second readout lines, of only a part of pixel circuits among the multiple pixel circuits having a change identified according to the time difference data or the state-change signal.

2. The optical sensor as claimed in claim 1, wherein the reference image is captured when the optical sensor is activated or woken up.

3. The optical sensor as claimed in claim 1, wherein the reference image is stored in a backend circuit.

4. The optical sensor as claimed in claim 3, wherein the backend circuit is further configured to update the reference image using the read image data of the part of pixel circuits.

5. The optical sensor as claimed in claim 1, wherein the processor is further configured not to read image data of the multiple pixel circuits acquired in the second interval upon no pixel circuit being identified having the change according to the time difference data or the state-change signal.

6. An optical sensor, comprising:
multiple pixel circuits arranged in a pixel array, each pixel circuit comprising:
a photodiode, configured to generate light energy;
a storage capacitor, having a first end and a second end;
an image circuit, connected to the first end of the storage capacitor, and configured to output image data associated with the light energy generated in a first interval by the photodiode; and
a difference circuit, connected to the second end of the storage capacitor, and configured to output time difference data associated with a variation of the light energy generated between the first interval and a second interval by the photodiode; and
a readout circuit, configured to
read image data of all the multiple pixel circuits acquired in the first interval to form a reference image, and
read image data, acquired in the second interval, of only a part of pixel circuits among the multiple pixel circuits having a change of the variation of the light energy according to the time difference data.

7. The optical sensor as claimed in claim 6, wherein the reference image is captured when the optical sensor is activated or woken up.

8. The optical sensor as claimed in claim 6, wherein the reference image is stored in a backend circuit.

9. The optical sensor as claimed in claim 8, wherein the backend circuit is further configured to update the reference image using the read image data of the part of pixel circuits.

10. The optical sensor as claimed in claim 6, further comprising an analog circuit configured to identify whether the multiple pixel circuits have the change of the variation of the light energy or not.

11. The optical sensor as claimed in claim 6, wherein the processor is further configured not to read image data of the multiple pixel circuits acquired in the second interval upon no pixel circuit being identified having the change of the variation of the light energy according to the time difference data.

12. The optical sensor as claimed in claim 6, wherein
the image circuit is configured to output the image data via a first comparator, which is shared by the image circuit with other pixel circuits, and
the difference circuit is configured to output the time difference data via a second comparator, which is shared by the difference circuit with said other pixel circuits,
wherein said other pixel circuits are pixel circuits at the same column of the pixel array as the each pixel circuit.

13. The optical sensor as claimed in claim 12, wherein
the first comparator is configured to compare a voltage at the first end of the storage capacitor with a ramp signal to generate the image data, and
the second comparator is configured to compare a voltage at the second end of the storage capacitor with a ramp signal to generate the time difference data.

14. The optical sensor as claimed in claim 12, wherein
the second comparator is configured to sequentially compare the time difference data with an upper threshold voltage and a lower threshold voltage to generate a state-change signal.

15. The optical sensor as claimed in claim 14, wherein the image circuit is configured not to output the image data when the second comparator does not generate the state-change signal.

16. The optical sensor as claimed in claim 14, wherein the second end of the storage capacitor is not reset before a next exposure interval when the second comparator does not generate the state-change signal.

17. The optical sensor as claimed in claim 14, wherein the first end of the storage capacitor is still reset when the second comparator does not generate the state-change signal.

18. The optical sensor as claimed in claim 14, wherein the first end of the storage capacitor is reset only when the second comparator generates the state-change signal.

19. An optical sensor, comprising:
multiple pixel circuits arranged in a pixel array, each pixel circuit comprising a storage capacitor and a photodiode, and being configured to output image data in a first interval and output time difference data in a second interval; and
a readout circuit, configured to
read, from the storage capacitor, the image data, generated by the photodiode, of all the multiple pixel circuits acquired in the first interval to form a reference image, and
read the image data, acquired in the second interval, of only a part of pixel circuits among the multiple pixel circuits having a change identified according to the time difference data, wherein the time difference data is associated with a variation of light energy read from the same storage capacitor and generated by the same photodiode between the first interval and the second interval in the each pixel circuit.

20. The optical sensor as claimed in claim 19, further comprising:
an image circuit, configured to output the image data associated with the light energy generated in the first interval by the photodiode; and
a difference circuit, arranged as a part of the each pixel circuit and configured to output the time difference data.

* * * * *